United States Patent
Guo et al.

(10) Patent No.: US 12,185,395 B2
(45) Date of Patent: Dec. 31, 2024

(54) COMMUNICATIONS METHOD AND APPARATUS TO REDUCE A DATA TRANSMISSION LATENCY BETWEEN AN IAB NODE AND IAB DONOR

(71) Applicant: Huawei Technologies Co., Ltd., Shenzhen (CN)

(72) Inventors: Longhua Guo, Shanghai (CN); Li Hu, Shanghai (CN); He Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 324 days.

(21) Appl. No.: 17/674,590

(22) Filed: Feb. 17, 2022

(65) Prior Publication Data
US 2022/0174761 A1 Jun. 2, 2022

Related U.S. Application Data

(63) Continuation of application No. PCT/CN2019/101250, filed on Aug. 18, 2019.

(51) Int. Cl.
*H04W 76/12* (2018.01)
*H04W 12/033* (2021.01)
(Continued)

(52) U.S. Cl.
CPC ......... *H04W 76/12* (2018.02); *H04W 12/033* (2021.01); *H04W 12/106* (2021.01); *H04W 88/14* (2013.01)

(58) Field of Classification Search
CPC . H04W 76/12; H04W 12/106; H04W 12/033; H04W 88/14; H04W 12/02;
(Continued)

(56) References Cited

U.S. PATENT DOCUMENTS

| | | | |
|---|---|---|---|
| 2008/0076392 A1 | 3/2008 | Khetawat et al. | |
| 2010/0260126 A1* | 10/2010 | Ulupinar | H04W 92/20 370/329 |

(Continued)

FOREIGN PATENT DOCUMENTS

| | | |
|---|---|---|
| CN | 102098676 A | 6/2011 |
| CN | 103188681 A | 7/2013 |

(Continued)

OTHER PUBLICATIONS

"3rd Generation Partnership Project; Technical Specification Group Radio Access Network; NR; Study on Integrated Access and Backhaul; (Release 16)," 3GPP TR 38.874 V16.0.0, total 111 pages, 3rd Generation Partnership Project, Valbonne, France (Dec. 2018).

(Continued)

*Primary Examiner* — Mewale A Ambaye
(74) *Attorney, Agent, or Firm* — Leydig, Voit & Mayer, Ltd.

(57) ABSTRACT

A communications method includes: an integrated access and backhaul (IAB) node receives an uplink data packet from a terminal; the IAB node determines a packet data convergence protocol (PDCP) layer security status of the uplink data packet; the IAB node determines a target secure tunnel from a plurality of secure tunnels between the IAB node and an IAB donor based on the PDCP layer security status of the uplink data packet; and the IAB node sends the uplink data packet to the IAB donor through the target secure tunnel. This application is applicable to a data transmission process.

20 Claims, 15 Drawing Sheets

(51) Int. Cl.
*H04W 12/106* (2021.01)
*H04W 88/14* (2009.01)

(58) Field of Classification Search
CPC ...... H04W 12/03; H04W 12/10; H04L 63/00; H04L 12/00; H04L 9/40
See application file for complete search history.

(56) References Cited

U.S. PATENT DOCUMENTS

| | | | | |
|---|---|---|---|---|
| 2011/0305339 | A1* | 12/2011 | Norrman | H04W 12/50 380/270 |
| 2015/0365790 | A1* | 12/2015 | Edge | H04W 76/50 455/456.1 |
| 2017/0331670 | A1* | 11/2017 | Parkvall | H04W 52/0229 |

FOREIGN PATENT DOCUMENTS

| | | | | |
|---|---|---|---|---|
| CN | 104506406 | A | | 4/2015 |
| CN | 105873038 | A | | 8/2016 |
| CN | 107079023 | A | | 8/2017 |
| CN | 109257212 | A | | 1/2019 |
| CN | 110072297 | A | | 7/2019 |
| EP | 2485561 | A1 | * 8/2012 | ......... H04L 63/1458 |
| WO | 2019062920 | A1 | | 4/2019 |

OTHER PUBLICATIONS

"3rd Generation Partnership Project; Technical Specification Group Services and System Aspects; 3GPP System Architecture Evolution (SAE); Security architecture (Release 15)," 3GPP TS 33.401 V15.5.0, total 163 pages, 3rd Generation Partnership Project, Valbonne, France (Sep. 2018).

"3rd Generation Partnership Project; Technical Specification Group Services and System Aspects; Procedures for the 5G System; Stage 2 (Release 16)," 3GPP TS 23.502 V16.1.1, total 495 pages, 3rd Generation Partnership Project, Valbonne, France (Jun. 2019).

"3rd Generation Partnership Project; Technical Specification Group Radio Access Network; NG-RAN; F1 application protocol (F1AP)(Release 15)," 3GPP TS 38.473 V15.6.0, total 220 pages, 3rd Generation Partnership Project, Valbonne, France (Jul. 2019).

"3rd Generation Partnership Project; Technical Specification Group Radio Access Network; NG-RAN; Architecture description (Release 15)," 3GPP TS 38.401 V15.6.0, total 46 pages, 3rd Generation Partnership Project, Valbonne, France (Jul. 2019).

"3rd Generation Partnership Project; Technical Specification Group Services and System Aspects; System Architecture for the 5G System; Stage 2 (Release 16)," 3GPP TS 23.501 V16.1.0, total 368 pages, 3rd Generation Partnership Project, Valbonne, France (Jun. 2019).

"3rd Generation Partnership Project; Technical Specification Group Services and System Aspects; Security architecture and procedures for 5G system (Release 15)," 3GPP TS 33.501 V15.5.0, total 190 pages, 3rd Generation Partnership Project, Valbonne, France (Jun. 2019).

* cited by examiner

COMMUNICATIONS METHOD AND APPARATUS TO REDUCE A DATA TRANSMISSION LATENCY BETWEEN AN IAB NODE AND IAB DONOR

CROSS-REFERENCE TO RELATED APPLICATIONS

This application is a continuation of International Application No. PCT/CN2019/101250, filed on Aug. 18, 2019, the disclosure of which is hereby incorporated by reference in its entirety.

TECHNICAL FIELD

This application relates to the field of communications technologies, and in particular, to a communications method and apparatus.

BACKGROUND

For the purpose of lightening construction load of a wired transmission network and providing flexible and dense new radio (NR) deployment, an integrated access and backhaul (IAB) technology is put forward in 5th generation (5G) NR. Based on the IAB technology, a base station may be divided into an IAB node and an IAB donor. The IAB donor is configured to provide a user equipment interface to a core network and support a wireless backhaul function of the IAB node. The IAB node can support wireless access of a terminal and wireless backhaul of data. Because the IAB donor and the IAB node can exchange data through a wireless backhaul link, there is no need to lay a cable between the IAB donor and the IAB node. This facilitates more flexible IAB node deployment.

A 5G network provides a plurality of services. Services such as the Internet of vehicles and ultra-reliable & low-latency communication (URLLC) require both high reliability and a low latency. However, a latency increases in a multi-hop architecture of an IAB network. Therefore, an end-to-end latency between a terminal and the IAB donor further needs to be reduced, so that the IAB network can be applied to more scenarios.

SUMMARY

This application provides a communications method and apparatus, to reduce a data transmission latency between an IAB node and an IAB donor. For specific content, refer to descriptions in any one of a first aspect to a ninth aspect.

Part 1

According to a first aspect, a communications system is provided, including a first node and a second node. A plurality of secure tunnels are established between the first node and the second node, and the plurality of secure tunnels correspond to different security statuses. The first node is configured to: receive an uplink data packet from a terminal; determine a packet data convergence protocol (PDCP) layer security status of the uplink data packet; determine a target secure tunnel based on the PDCP layer security status of the uplink data packet and the security statuses of the plurality of secure tunnels; and send the uplink data packet to the second node through the target secure tunnel. The second node is configured to: receive the uplink data packet from the first node; and send the uplink data packet to a user plane network element.

Compared with that in the current technology in which the first node needs to perform encryption calculation and integrity protection calculation on an uplink data packet before transmitting the uplink data packet through a secure tunnel, according to the technical solutions provided in the embodiments of this application, in some cases, before transmitting the uplink data packet through the target secure tunnel, the first node does not need to perform encryption calculation and/or integrity protection calculation on the uplink data packet. This reduces a latency of processing the uplink data packet by the first node. Correspondingly, the second node does not need to perform decryption calculation and/or integrity check calculation on the data packet. This reduces a latency of processing the uplink data packet by the second node. In other words, according to the technical solutions provided in this application, the latencies of processing the data packet by the first node and the second node are reduced, to reduce a latency of transmitting the data packet between the first node and the second node.

In a possible design, the first node is specifically configured to determine the PDCP layer security status of the uplink data packet based on whether the uplink data packet carries a message authentication code for integrity (MAC-I).

In a possible design, the first node is specifically configured to: if the uplink data packet does not carry the MAC-I, determine that the PDCP layer security status of the uplink data packet is integrity protection disabled; or if the uplink data packet carries the MAC-I, determine that the PDCP layer security status of the uplink data packet is integrity protection enabled.

In a possible design, the first node is specifically configured to determine the PDCP layer security status of the uplink data packet based on a pre-stored first correspondence and an identifier of a first transmission tunnel used to transmit the uplink data packet, where the first correspondence is a correspondence between an identifier of a first transmission tunnel and a PDCP layer security status, and the first transmission tunnel is a transmission tunnel between the first node and the second node.

In a possible design, the second node is further configured to: obtain a correspondence between an identifier of a protocol data unit (PDU) session and a PDCP layer security status; obtain a correspondence between an identifier of a PDU session and an identifier of a first transmission tunnel; generate the first correspondence based on the correspondence between an identifier of a PDU session and a PDCP layer security status and the correspondence between an identifier of a PDU session and an identifier of a first transmission tunnel; and send the first correspondence to the first node. The first node is further configured to receive the first correspondence.

In a possible design, the first node is specifically configured to select a secure tunnel whose security status is complementary to the PDCP layer security status of the uplink data packet from the plurality of secure tunnels as the target secure tunnel based on the PDCP layer security status of the uplink data packet and the security statuses of the plurality of secure tunnels.

From different perspectives for security status consideration, the following specifically describes how the security status of the target secure tunnel is complementary to the PDCP layer security status of the uplink data packet.

In a possible design, that the security status of the target secure tunnel is complementary to the PDCP layer security status of the uplink data packet includes one of the following cases: (1) if the PDCP layer security status of the uplink data packet is integrity protection enabled, the security status of the target secure tunnel is integrity protection disabled; and (2) if the PDCP layer security status of the uplink data packet is integrity protection disabled, the security status of the target secure tunnel is integrity protection enabled.

In a possible design, that the security status of the target secure tunnel is complementary to the PDCP layer security status of the uplink data packet includes one of the following cases: (1) if the PDCP layer security status of the uplink data packet is encryption protection enabled, the security status of the target secure tunnel is encryption protection disabled; and (2) if the PDCP layer security status of the uplink data packet is encryption protection disabled, the security status of the target secure tunnel is encryption protection enabled.

In a possible design, that the security status of the target secure tunnel is complementary to the PDCP layer security status of the uplink data packet includes one of the following cases: (1) if the PDCP layer security status of the uplink data packet is both integrity protection and encryption protection disabled, the security status of the target secure tunnel is both integrity protection and encryption protection enabled; (2) if the PDCP layer security status of the uplink data packet is both integrity protection and encryption protection enabled, the security status of the target secure tunnel is both integrity protection and encryption protection disabled; (3) if the PDCP layer security status of the uplink data packet is integrity protection enabled and encryption protection disabled, the security status of the target secure tunnel is integrity protection disabled and encryption protection enabled; and (4) if the PDCP layer security status of the uplink data packet is integrity protection disabled and encryption protection enabled, the security status of the target secure tunnel is integrity protection enabled and encryption protection disabled.

In a possible design, the first node is specifically configured to select a secure tunnel whose security status is the same as the PDCP layer security status of the uplink data packet from the plurality of secure tunnels as the target secure tunnel based on the PDCP layer security status of the uplink data packet and the security statuses of the plurality of secure tunnels.

From different perspectives for security status consideration, the following specifically describes how the security status of the target secure tunnel is the same as the PDCP layer security status of the uplink data packet.

In a possible design, that the security status of the target secure tunnel is the same as the PDCP layer security status of the uplink data packet includes one of the following cases: (1) if the PDCP layer security status of the uplink data packet is integrity protection enabled, the security status of the target secure tunnel is integrity protection enabled; and (2) if the PDCP layer security status of the uplink data packet is integrity protection disabled, the security status of the target secure tunnel is integrity protection disabled.

In a possible design, that the security status of the target secure tunnel is the same as the PDCP layer security status of the uplink data packet includes one of the following cases: (1) if the PDCP layer security status of the uplink data packet is encryption protection enabled, the security status of the target secure tunnel is encryption protection enabled; and (2) if the PDCP layer security status of the uplink data packet is encryption protection disabled, the security status of the target secure tunnel is encryption protection disabled.

In a possible design, that the security status of the target secure tunnel is complementary to the PDCP layer security status of the uplink data packet includes one of the following cases: (1) if the PDCP layer security status of the uplink data packet is both integrity protection and encryption protection disabled, the security status of the target secure tunnel is both integrity protection and encryption protection disabled; (2) if the PDCP layer security status of the uplink data packet is both integrity protection and encryption protection enabled, the security status of the target secure tunnel is both integrity protection and encryption protection enabled; (3) if the PDCP layer security status of the uplink data packet is integrity protection enabled and encryption protection disabled, the security status of the target secure tunnel is integrity protection enabled and encryption protection disabled; and (4) if the PDCP layer security status of the uplink data packet is integrity protection disabled and encryption protection enabled, the security status of the target secure tunnel is integrity protection disabled and encryption protection enabled.

In a possible design, the second node is further configured to: receive a downlink data packet from the user plane network element; determine a PDCP layer security status of the downlink data packet; determine a target secure tunnel based on the PDCP layer security status of the downlink data packet and the security statuses of the plurality of secure tunnels; and send the downlink data packet to the first node through the target secure tunnel. The first node is further configured to: receive the downlink data packet from the second node; and send the downlink data packet to the terminal.

Compared with that in the current technology in which the second node needs to perform encryption calculation and integrity protection calculation on a downlink data packet in addition to transmitting the downlink data packet through a secure tunnel, according to the technical solutions provided in the embodiments of this application, in some cases, the second node transmits the downlink data packet through the target secure tunnel, and may not perform encryption calculation and/or integrity protection calculation on the downlink data packet. This reduces a latency of processing the downlink data packet by the second node. Correspondingly, the first node does not need to perform decryption calculation and/or integrity check calculation on the data packet. This reduces a latency of processing the downlink data packet by the first node. In other words, according to the technical solutions provided in this application, the latencies of processing the data packet by the first node and the second node are reduced, to reduce a latency of transmitting the data packet between the first node and the second node.

In a possible design, the second node is specifically configured to determine the PDCP layer security status of the downlink data packet based on whether the downlink data packet carries a MAC-I.

In a possible design, the second node is specifically configured to: if the downlink data packet does not carry the MAC-I, determine that the PDCP layer security status of the downlink data packet is integrity protection disabled; or if the downlink data packet carries the MAC-I, determine that the PDCP layer security status of the downlink data packet is integrity protection enabled.

In a possible design, the second node is specifically configured to determine the PDCP layer security status of the downlink data packet based on a pre-stored second correspondence and an identifier of a second transmission tunnel used to transmit the downlink data packet, where the second correspondence is a correspondence between an identifier of a second transmission tunnel and a PDCP layer security status, and the second transmission tunnel is a transmission tunnel between the second node and the user plane network element.

In a possible design, the second node is further configured to: obtain a correspondence between an identifier of a PDU session and a PDCP layer security status; obtain a correspondence between a PDU session and an identifier of a second transmission tunnel; and generate the second correspondence based on the correspondence between an identifier of a PDU session and a PDCP layer security status and the correspondence between a PDU session and an identifier of a second transmission tunnel.

In a possible design, the second node is specifically configured to select a secure tunnel whose security status is complementary to the PDCP layer security status of the downlink data packet from the plurality of secure tunnels as the target secure tunnel based on the PDCP layer security status of the downlink data packet and the security statuses of the plurality of secure tunnels.

From different perspectives for security status consideration, the following specifically describes how the security status of the target secure tunnel is complementary to the PDCP layer security status of the downlink data packet.

In a possible design, that the security status of the target secure tunnel is complementary to the PDCP layer security status of the downlink data packet includes one of the following cases: (1) if the PDCP layer security status of the downlink data packet is integrity protection enabled, the security status of the target secure tunnel is integrity protection disabled; and (2) if the PDCP layer security status of the downlink data packet is integrity protection disabled, the security status of the target secure tunnel is integrity protection enabled.

In a possible design, that the security status of the target secure tunnel is complementary to the PDCP layer security status of the downlink data packet includes one of the following cases: (1) if the PDCP layer security status of the downlink data packet is encryption protection enabled, the security status of the target secure tunnel is encryption protection disabled; and (2) if the PDCP layer security status of the downlink data packet is encryption protection disabled, the security status of the target secure tunnel is encryption protection enabled.

In a possible design, that the security status of the target secure tunnel is complementary to the PDCP layer security status of the downlink data packet includes one of the following cases: (1) if the PDCP layer security status of the downlink data packet is both integrity protection and encryption protection disabled, the security status of the target secure tunnel is both integrity protection and encryption protection enabled; (2) if the PDCP layer security status of the downlink data packet is both integrity protection and encryption protection enabled, the security status of the target secure tunnel is both integrity protection and encryption protection disabled; (3) if the PDCP layer security status of the downlink data packet is integrity protection enabled and encryption protection disabled, the security status of the target secure tunnel is integrity protection disabled and encryption protection enabled; and (4) if the PDCP layer security status of the downlink data packet is integrity protection disabled and encryption protection enabled, the security status of the target secure tunnel is integrity protection enabled and encryption protection disabled.

In a possible design, the second node is specifically configured to select a secure tunnel whose security status is the same as the PDCP layer security status of the downlink data packet from the plurality of secure tunnels as the target secure tunnel based on the PDCP layer security status of the downlink data packet and the security statuses of the plurality of secure tunnels.

From different perspectives for security status consideration, the following specifically describes how the security status of the target secure tunnel is the same as the PDCP layer security status of the downlink data packet.

In a possible design, that the security status of the target secure tunnel is the same as the PDCP layer security status of the downlink data packet includes one of the following cases: (1) if the PDCP layer security status of the downlink data packet is integrity protection enabled, the security status of the target secure tunnel is integrity protection enabled; and (2) if the PDCP layer security status of the downlink data packet is integrity protection disabled, the security status of the target secure tunnel is integrity protection disabled.

In a possible design, that the security status of the target secure tunnel is the same as the PDCP layer security status of the downlink data packet includes one of the following cases: (1) if the PDCP layer security status of the downlink data packet is encryption protection enabled, the security status of the target secure tunnel is encryption protection enabled; and (2) if the PDCP layer security status of the downlink data packet is encryption protection disabled, the security status of the target secure tunnel is encryption protection disabled.

In a possible design, that the security status of the target secure tunnel is complementary to the PDCP layer security status of the downlink data packet includes one of the following cases: (1) if the PDCP layer security status of the downlink data packet is both integrity protection and encryption protection disabled, the security status of the target secure tunnel is both integrity protection and encryption protection disabled; (2) if the PDCP layer security status of the downlink data packet is both integrity protection and encryption protection enabled, the security status of the target secure tunnel is both integrity protection and encryption protection enabled; (3) if the PDCP layer security status of the downlink data packet is integrity protection enabled and encryption protection disabled, the security status of the target secure tunnel is integrity protection enabled and encryption protection disabled; and (4) if the PDCP layer security status of the downlink data packet is integrity protection disabled and encryption protection enabled, the security status of the target secure tunnel is integrity protection disabled and encryption protection enabled.

According to a second aspect, a communications method is provided. The communications method is applied to a first node, a plurality of secure tunnels are established between the first node and a second node, and the plurality of secure tunnels correspond to different security statuses. The method includes: The first node receives an uplink data packet from a terminal; the first node determines a PDCP layer security status of the uplink data packet; the first node determines a target secure tunnel based on the PDCP layer security status of the uplink data packet and the plurality of secure tunnels, where the plurality of secure tunnels correspond to the different security statuses; and the first node sends the uplink data packet to the second node through the target secure tunnel.

Compared with that in the current technology in which the first node needs to perform encryption calculation and integrity protection calculation on an uplink data packet in addition to transmitting the uplink data packet through a secure tunnel, according to the technical solutions provided in the embodiments of this application, in some cases, the first node transmits the uplink data packet through the target secure tunnel, and may not perform encryption calculation and/or integrity protection calculation on the uplink data packet. This reduces a latency of processing the uplink data packet by the first node. Correspondingly, the second node does not need to perform decryption calculation and/or integrity check calculation on the data packet. This reduces a latency of processing the uplink data packet by the second node. In other words, according to the technical solutions provided in this application, the latencies of processing the data packet by the first node and the second node are reduced, to reduce a latency of transmitting the data packet between the first node and the second node.

In a possible design, that the first node determines a PDCP layer security status of the uplink data packet includes: The first node determines the PDCP layer security status of the uplink data packet based on whether the uplink data packet carries a MAC-I. Based on this design, the first node can quickly determine whether the uplink data packet is integrity-protected at a PDCP layer.

In a possible design, that the first node determines the PDCP layer security status of the uplink data packet based on whether the uplink data packet carries a MAC-I includes: If the uplink data packet does not carry the MAC-I, the first node determines that the PDCP layer security status of the uplink data packet is integrity protection disabled; or if the uplink data packet carries the MAC-I, the first node determines that the PDCP layer security status of the uplink data packet is integrity protection enabled.

In a possible design, that the first node determines a PDCP layer security status of the uplink data packet includes: The first node determines the PDCP layer security status of the uplink data packet based on a pre-stored first correspondence and an identifier of a first transmission tunnel used to transmit the uplink data packet, where the first correspondence is a correspondence between an identifier of a first transmission tunnel and a PDCP layer security status, and the first transmission tunnel is a transmission tunnel between the first node and the second node. Based on this design, the first node can accurately determine whether the uplink data packet is encryption-protected and/or integrity-protected at a PDCP layer.

In a possible design, the method further includes: The first node receives the first correspondence sent by the second node.

In a possible design, that the first node determines a target secure tunnel based on the PDCP layer security status of the uplink data packet and the security statuses of the plurality of secure tunnels includes: The first node selects a secure tunnel whose security status is complementary to the PDCP layer security status of the uplink data packet from the plurality of secure tunnels as the target secure tunnel based on the PDCP layer security status of the uplink data packet and the security statuses of the plurality of secure tunnels.

From different perspectives for security status consideration, the following specifically describes how the security status of the target secure tunnel is complementary to the PDCP layer security status of the uplink data packet.

In a possible design, that the security status of the target secure tunnel is complementary to the PDCP layer security status of the uplink data packet includes one of the following cases: (1) if the PDCP layer security status of the uplink data packet is integrity protection enabled, the security status of the target secure tunnel is integrity protection disabled; and (2) if the PDCP layer security status of the uplink data packet is integrity protection disabled, the security status of the target secure tunnel is integrity protection enabled.

In a possible design, that the security status of the target secure tunnel is complementary to the PDCP layer security status of the uplink data packet includes one of the following cases: (1) if the PDCP layer security status of the uplink data packet is encryption protection enabled, the security status of the target secure tunnel is encryption protection disabled; and (2) if the PDCP layer security status of the uplink data packet is encryption protection disabled, the security status of the target secure tunnel is encryption protection enabled.

In a possible design, that the security status of the target secure tunnel is complementary to the PDCP layer security status of the uplink data packet includes one of the following cases: (1) if the PDCP layer security status of the uplink data packet is both integrity protection and encryption protection disabled, the security status of the target secure tunnel is both integrity protection and encryption protection enabled; (2) if the PDCP layer security status of the uplink data packet is both integrity protection and encryption protection enabled, the security status of the target secure tunnel is both integrity protection and encryption protection disabled; (3) if the PDCP layer security status of the uplink data packet is integrity protection enabled and encryption protection disabled, the security status of the target secure tunnel is integrity protection disabled and encryption protection enabled; and (4) if the PDCP layer security status of the uplink data packet is integrity protection disabled and encryption protection enabled, the security status of the target secure tunnel is integrity protection enabled and encryption protection disabled.

In a possible design, that the first node determines a target secure tunnel based on the PDCP layer security status of the uplink data packet and the security statuses of the plurality of secure tunnels includes: The first node selects a secure tunnel whose security status is the same as the PDCP layer security status of the uplink data packet from the plurality of secure tunnels as the target secure tunnel based on the PDCP layer security status of the uplink data packet and the security statuses of the plurality of secure tunnels.

From different perspectives for security status consideration, the following specifically describes how the security status of the target secure tunnel is the same as the PDCP layer security status of the uplink data packet.

In a possible design, that the security status of the target secure tunnel is the same as the PDCP layer security status of the uplink data packet includes one of the following cases: (1) if the PDCP layer security status of the uplink data packet is integrity protection enabled, the security status of the target secure tunnel is integrity protection enabled; and (2) if the PDCP layer security status of the uplink data packet is integrity protection disabled, the security status of the target secure tunnel is integrity protection disabled.

In a possible design, that the security status of the target secure tunnel is the same as the PDCP layer security status of the uplink data packet includes one of the following cases: (1) if the PDCP layer security status of the uplink data packet is encryption protection enabled, the security status of the target secure tunnel is encryption protection enabled; and (2) if the PDCP layer security status of the uplink data packet is encryption protection disabled, the security status of the target secure tunnel is encryption protection disabled.

In a possible design, that the security status of the target secure tunnel is complementary to the PDCP layer security status of the uplink data packet includes one of the following cases: (1) if the PDCP layer security status of the uplink data packet is both integrity protection and encryption protection disabled, the security status of the target secure tunnel is both integrity protection and encryption protection disabled;

(2) if the PDCP layer security status of the uplink data packet is both integrity protection and encryption protection enabled, the security status of the target secure tunnel is both integrity protection and encryption protection enabled; (3) if the PDCP layer security status of the uplink data packet is integrity protection enabled and encryption protection disabled, the security status of the target secure tunnel is integrity protection enabled and encryption protection disabled; and (4) if the PDCP layer security status of the uplink data packet is integrity protection disabled and encryption protection enabled, the security status of the target secure tunnel is integrity protection disabled and encryption protection enabled.

According to a third aspect, a communications method is provided. The communications method is applied to a second node, a plurality of secure tunnels are established between the second node and a first node, and the plurality of secure tunnels correspond to different security statuses. The method includes: The second node receives a downlink data packet from a user plane network element; the second node determines a PDCP layer security status of the downlink data packet; the second node determines a target secure tunnel based on the PDCP layer security status of the downlink data packet and the security statuses of the plurality of secure tunnels, where the plurality of secure tunnels correspond to the different security statuses; and the second node sends the downlink data packet to the first node through the target secure tunnel.

Compared with that in the current technology in which the second node needs to perform encryption calculation and integrity protection calculation on a downlink data packet before transmitting the downlink data packet through a secure tunnel, according to the technical solutions provided in the embodiments of this application, in some cases, the second node transmits the downlink data packet through the target secure tunnel, and may not perform encryption calculation and/or integrity protection calculation on the downlink data packet. This reduces a latency of processing the downlink data packet by the second node. Correspondingly, the first node does not need to perform decryption calculation and/or integrity check calculation on the data packet. This reduces a latency of processing the uplink data packet by the first node. In other words, according to the technical solutions provided in this application, the latencies of processing the data packet by the first node and the second node are reduced, to reduce a latency of transmitting the data packet between the first node and the second node.

In a possible design, that the second node determines a PDCP layer security status of the downlink data packet includes: The second node determines the PDCP layer security status of the downlink data packet based on whether the downlink data packet carries a MAC-I. Based on this design, the second node can quickly determine whether the downlink data packet is integrity-protected at a PDCP layer.

In a possible design, that the second node determines the PDCP layer security status of the downlink data packet based on whether the downlink data packet carries a MAC-I includes: If the downlink data packet does not carry the MAC-I, the second node determines that the PDCP layer security status of the downlink data packet is integrity protection disabled; or if the downlink data packet carries the MAC-I, the second node determines that the PDCP layer security status of the downlink data packet is integrity protection enabled.

In a possible design, that the second node determines a PDCP layer security status of the downlink data packet includes: The second node determines the PDCP layer security status of the downlink data packet based on a pre-stored second correspondence and an identifier of a second transmission tunnel used to transmit the downlink data packet, where the second correspondence is a correspondence between an identifier of a second transmission tunnel and a PDCP layer security status, and the second transmission tunnel is a transmission tunnel between the second node and the user plane network element. Based on this design, the second node can accurately determine whether the downlink data packet is encryption-protected and/or integrity-protected at a PDCP layer.

In a possible design, the method further includes: The second node obtains a correspondence between an identifier of a PDU session and a PDCP layer security status; the second node obtains a correspondence between a PDU session and an identifier of a second transmission tunnel; and the second node generates the second correspondence based on the correspondence between an identifier of a PDU session and a PDCP layer security status and the correspondence between a PDU session and an identifier of a second transmission tunnel.

In a possible design, the method further includes: The second node obtains the correspondence between an identifier of a PDU session and a PDCP layer security status; the second node obtains a correspondence between an identifier of a PDU session and an identifier of a first transmission tunnel; the second node generates a first correspondence based on the correspondence between an identifier of a PDU session and a PDCP layer security status and the correspondence between an identifier of a PDU session and an identifier of a first transmission tunnel; and the second node sends the first correspondence to the first node.

In a possible design, that the second node determines a target secure tunnel based on the PDCP layer security status of the downlink data packet and the security statuses of the plurality of secure tunnels includes: The second node selects a secure tunnel whose security status is complementary to the PDCP layer security status of the downlink data packet from the plurality of secure tunnels as the target secure tunnel based on the PDCP layer security status of the downlink data packet and the security statuses of the plurality of secure tunnels.

From different perspectives for security status consideration, the following specifically describes how the security status of the target secure tunnel is complementary to the PDCP layer security status of the downlink data packet.

In a possible design, that the security status of the target secure tunnel is complementary to the PDCP layer security status of the downlink data packet includes one of the following cases: (1) if the PDCP layer security status of the downlink data packet is integrity protection enabled, the security status of the target secure tunnel is integrity protection disabled; and (2) if the PDCP layer security status of the downlink data packet is integrity protection disabled, the security status of the target secure tunnel is integrity protection enabled.

In a possible design, that the security status of the target secure tunnel is complementary to the PDCP layer security status of the downlink data packet includes one of the following cases: (1) if the PDCP layer security status of the downlink data packet is encryption protection enabled, the security status of the target secure tunnel is encryption protection disabled; and (2) if the PDCP layer security status of the downlink data packet is encryption protection disabled, the security status of the target secure tunnel is encryption protection enabled.

In a possible design, that the security status of the target secure tunnel is complementary to the PDCP layer security status of the downlink data packet includes one of the following cases: (1) if the PDCP layer security status of the downlink data packet is both integrity protection and encryption protection disabled, the security status of the target secure tunnel is both integrity protection and encryption protection enabled; (2) if the PDCP layer security status of the downlink data packet is both integrity protection and encryption protection enabled, the security status of the target secure tunnel is both integrity protection and encryption protection disabled; (3) if the PDCP layer security status of the downlink data packet is integrity protection enabled and encryption protection disabled, the security status of the target secure tunnel is integrity protection disabled and encryption protection enabled; and (4) if the PDCP layer security status of the downlink data packet is integrity protection disabled and encryption protection enabled, the security status of the target secure tunnel is integrity protection enabled and encryption protection disabled.

From different perspectives for security status consideration, the following specifically describes how the security status of the target secure tunnel is the same as the PDCP layer security status of the downlink data packet.

In a possible design, that the security status of the target secure tunnel is the same as the PDCP layer security status of the downlink data packet includes one of the following cases: (1) if the PDCP layer security status of the downlink data packet is integrity protection enabled, the security status of the target secure tunnel is integrity protection enabled; and (2) if the PDCP layer security status of the downlink data packet is integrity protection disabled, the security status of the target secure tunnel is integrity protection disabled.

In a possible design, that the security status of the target secure tunnel is the same as the PDCP layer security status of the downlink data packet includes one of the following cases: (1) if the PDCP layer security status of the downlink data packet is encryption protection enabled, the security status of the target secure tunnel is encryption protection enabled; and (2) if the PDCP layer security status of the downlink data packet is encryption protection disabled, the security status of the target secure tunnel is encryption protection disabled.

In a possible design, that the security status of the target secure tunnel is complementary to the PDCP layer security status of the downlink data packet includes one of the following cases: (1) if the PDCP layer security status of the downlink data packet is both integrity protection and encryption protection disabled, the security status of the target secure tunnel is both integrity protection and encryption protection disabled; (2) if the PDCP layer security status of the downlink data packet is both integrity protection and encryption protection enabled, the security status of the target secure tunnel is both integrity protection and encryption protection enabled; (3) if the PDCP layer security status of the downlink data packet is integrity protection enabled and encryption protection disabled, the security status of the target secure tunnel is integrity protection enabled and encryption protection disabled; and (4) if the PDCP layer security status of the downlink data packet is integrity protection disabled and encryption protection enabled, the security status of the target secure tunnel is integrity protection disabled and encryption protection enabled.

According to a fourth aspect, a communications apparatus is provided. A plurality of secure tunnels are established between the communications apparatus and a second node, and the plurality of secure tunnels correspond to different security statuses. The communications apparatus includes: a communications module, configured to receive an uplink data packet from a terminal; and a processing module, configured to: determine a PDCP layer security status of the uplink data packet; and determine a target secure tunnel based on the PDCP layer security status of the uplink data packet and the security statuses of the plurality of secure tunnels, where the plurality of secure tunnels correspond to the different security statuses. The communications module is further configured to send the uplink data packet to the second node through the target secure tunnel.

In a possible design, the processing module is specifically configured to determine the PDCP layer security status of the uplink data packet based on whether the uplink data packet carries a MAC-I.

In a possible design, the processing module is specifically configured to: if the uplink data packet does not carry the MAC-I, determine that the PDCP layer security status of the uplink data packet is integrity protection disabled; or if the uplink data packet carries the MAC-I, determine that the PDCP layer security status of the uplink data packet is integrity protection enabled.

In a possible design, the processing module is specifically configured to determine the PDCP layer security status of the uplink data packet based on a pre-stored first correspondence and an identifier of a first transmission tunnel used to transmit the uplink data packet, where the first correspondence is a correspondence between an identifier of a first transmission tunnel and a PDCP layer security status, and the first transmission tunnel is a transmission tunnel between the communications apparatus and the second node.

In a possible design, the communications module is further configured to receive the first correspondence sent by the second node.

In a possible design, the processing module is specifically configured to select a secure tunnel whose security status is complementary to the PDCP layer security status of the uplink data packet from the plurality of secure tunnels as the target secure tunnel based on the PDCP layer security status of the uplink data packet and the security statuses of the plurality of secure tunnels.

From different perspectives for security status consideration, the following specifically describes how the security status of the target secure tunnel is complementary to the PDCP layer security status of the uplink data packet.

In a possible design, that the security status of the target secure tunnel is complementary to the PDCP layer security status of the uplink data packet includes one of the following cases: (1) if the PDCP layer security status of the uplink data packet is integrity protection enabled, the security status of the target secure tunnel is integrity protection disabled; and (2) if the PDCP layer security status of the uplink data packet is integrity protection disabled, the security status of the target secure tunnel is integrity protection enabled.

In a possible design, that the security status of the target secure tunnel is complementary to the PDCP layer security status of the uplink data packet includes one of the following cases: (1) if the PDCP layer security status of the uplink data packet is encryption protection enabled, the security status of the target secure tunnel is encryption protection disabled; and (2) if the PDCP layer security status of the uplink data packet is encryption protection disabled, the security status of the target secure tunnel is encryption protection enabled.

In a possible design, that the security status of the target secure tunnel is complementary to the PDCP layer security status of the uplink data packet includes one of the following cases: (1) if the PDCP layer security status of the uplink data packet is both integrity protection and encryption protection disabled, the security status of the target secure tunnel is both integrity protection and encryption protection enabled; (2) if the PDCP layer security status of the uplink data packet is both integrity protection and encryption protection enabled, the security status of the target secure tunnel is both integrity protection and encryption protection disabled; (3) if the PDCP layer security status of the uplink data packet is integrity protection enabled and encryption protection disabled, the security status of the target secure tunnel is integrity protection disabled and encryption protection enabled; and (4) if the PDCP layer security status of the uplink data packet is integrity protection disabled and encryption protection enabled, the security status of the target secure tunnel is integrity protection enabled and encryption protection disabled.

In a possible design, the processing module is specifically configured to select a secure tunnel whose security status is the same as the PDCP layer security status of the uplink data packet from the plurality of secure tunnels as the target secure tunnel based on the PDCP layer security status of the uplink data packet and the security statuses of the plurality of secure tunnels.

From different perspectives for security status consideration, the following specifically describes how the security status of the target secure tunnel is the same as the PDCP layer security status of the uplink data packet.

In a possible design, that the security status of the target secure tunnel is the same as the PDCP layer security status of the uplink data packet includes one of the following cases: (1) if the PDCP layer security status of the uplink data packet is integrity protection enabled, the security status of the target secure tunnel is integrity protection enabled; and (2) if the PDCP layer security status of the uplink data packet is integrity protection disabled, the security status of the target secure tunnel is integrity protection disabled.

In a possible design, that the security status of the target secure tunnel is the same as the PDCP layer security status of the uplink data packet includes one of the following cases: (1) if the PDCP layer security status of the uplink data packet is encryption protection enabled, the security status of the target secure tunnel is encryption protection enabled; and (2) if the PDCP layer security status of the uplink data packet is encryption protection disabled, the security status of the target secure tunnel is encryption protection disabled.

In a possible design, that the security status of the target secure tunnel is complementary to the PDCP layer security status of the uplink data packet includes one of the following cases: (1) if the PDCP layer security status of the uplink data packet is both integrity protection and encryption protection disabled, the security status of the target secure tunnel is both integrity protection and encryption protection disabled; (2) if the PDCP layer security status of the uplink data packet is both integrity protection and encryption protection enabled, the security status of the target secure tunnel is both integrity protection and encryption protection enabled; (3) if the PDCP layer security status of the uplink data packet is integrity protection enabled and encryption protection disabled, the security status of the target secure tunnel is integrity protection enabled and encryption protection disabled; and (4) if the PDCP layer security status of the uplink data packet is integrity protection disabled and encryption protection enabled, the security status of the target secure tunnel is integrity protection disabled and encryption protection enabled.

According to a fifth aspect, a communications apparatus is provided. A plurality of secure tunnels are established between the communications apparatus and a first node, and the plurality of secure tunnels correspond to different security statuses. The communications apparatus includes: a communications module, configured to receive a downlink data packet from a user plane network element; and a processing module, configured to: determine a PDCP layer security status of the downlink data packet; and determine a target secure tunnel based on the PDCP layer security status of the downlink data packet and the security statuses of the plurality of secure tunnels, where the plurality of secure tunnels correspond to the different security statuses. The communications module is configured to send the downlink data packet to the first node through the target secure tunnel.

In a possible design, the processing module is specifically configured to determine the PDCP layer security status of the downlink data packet based on whether the downlink data packet carries a MAC-I.

In a possible design, the processing module is specifically configured to: if the downlink data packet does not carry the MAC-I, determine that the PDCP layer security status of the downlink data packet is integrity protection disabled; or if the downlink data packet carries the MAC-I, determine that the PDCP layer security status of the downlink data packet is integrity protection enabled.

In a possible design, the processing module is configured to determine the PDCP layer security status of the downlink data packet based on a pre-stored second correspondence and an identifier of a second transmission tunnel used to transmit the downlink data packet, where the second correspondence is a correspondence between an identifier of a second transmission tunnel and a PDCP layer security status, and the second transmission tunnel is a transmission tunnel between the second node and the user plane network element.

In a possible design, the processing module is further configured to: obtain a correspondence between an identifier of a PDU session and a PDCP layer security status; obtain a correspondence between a PDU session and an identifier of a second transmission tunnel; and generate the second correspondence based on the correspondence between an identifier of a PDU session and a PDCP layer security status and the correspondence between a PDU session and an identifier of a second transmission tunnel.

In a possible design, the processing module is further configured to: obtain the correspondence between an identifier of a PDU session and a PDCP layer security status; obtain a correspondence between an identifier of a PDU session and an identifier of a first transmission tunnel; and generate a first correspondence based on the correspondence between an identifier of a PDU session and a PDCP layer security status and the correspondence between an identifier of a PDU session and an identifier of a first transmission tunnel. The communications module is further configured to send the first correspondence to the first node.

In a possible design, the processing module is specifically configured to select a secure tunnel whose security status is complementary to the PDCP layer security status of the downlink data packet from the plurality of secure tunnels as the target secure tunnel based on the PDCP layer security status of the downlink data packet and the security statuses of the plurality of secure tunnels.

From different perspectives for security status consideration, the following specifically describes how the security status of the target secure tunnel is complementary to the PDCP layer security status of the downlink data packet.

In a possible design, that the security status of the target secure tunnel is complementary to the PDCP layer security status of the downlink data packet includes one of the following cases: (1) if the PDCP layer security status of the downlink data packet is integrity protection enabled, the security status of the target secure tunnel is integrity protection disabled; and (2) if the PDCP layer security status of the downlink data packet is integrity protection disabled, the security status of the target secure tunnel is integrity protection enabled.

In a possible design, that the security status of the target secure tunnel is complementary to the PDCP layer security status of the downlink data packet includes one of the following cases: (1) if the PDCP layer security status of the downlink data packet is encryption protection enabled, the security status of the target secure tunnel is encryption protection disabled; and (2) if the PDCP layer security status of the downlink data packet is encryption protection disabled, the security status of the target secure tunnel is encryption protection enabled.

In a possible design, that the security status of the target secure tunnel is complementary to the PDCP layer security status of the downlink data packet includes one of the following cases: (1) if the PDCP layer security status of the downlink data packet is both integrity protection and encryption protection disabled, the security status of the target secure tunnel is both integrity protection and encryption protection enabled; (2) if the PDCP layer security status of the downlink data packet is both integrity protection and encryption protection enabled, the security status of the target secure tunnel is both integrity protection and encryption protection disabled; (3) if the PDCP layer security status of the downlink data packet is integrity protection enabled and encryption protection disabled, the security status of the target secure tunnel is integrity protection disabled and encryption protection enabled; and (4) if the PDCP layer security status of the downlink data packet is integrity protection disabled and encryption protection enabled, the security status of the target secure tunnel is integrity protection enabled and encryption protection disabled.

In a possible design, the processing module is specifically configured to select a secure tunnel whose security status is the same as the PDCP layer security status of the downlink data packet from the plurality of secure tunnels as the target secure tunnel based on the PDCP layer security status of the downlink data packet and the security statuses of the plurality of secure tunnels.

From different perspectives for security status consideration, the following specifically describes how the security status of the target secure tunnel is the same as the PDCP layer security status of the downlink data packet.

In a possible design, that the security status of the target secure tunnel is the same as the PDCP layer security status of the downlink data packet includes one of the following cases: (1) if the PDCP layer security status of the downlink data packet is integrity protection enabled, the security status of the target secure tunnel is integrity protection enabled; and (2) if the PDCP layer security status of the downlink data packet is integrity protection disabled, the security status of the target secure tunnel is integrity protection disabled.

In a possible design, that the security status of the target secure tunnel is the same as the PDCP layer security status of the downlink data packet includes one of the following cases: (1) if the PDCP layer security status of the downlink data packet is encryption protection enabled, the security status of the target secure tunnel is encryption protection enabled; and (2) if the PDCP layer security status of the downlink data packet is encryption protection disabled, the security status of the target secure tunnel is encryption protection disabled.

In a possible design, that the security status of the target secure tunnel is complementary to the PDCP layer security status of the downlink data packet includes one of the following cases: (1) if the PDCP layer security status of the downlink data packet is both integrity protection and encryption protection disabled, the security status of the target secure tunnel is both integrity protection and encryption protection disabled; (2) if the PDCP layer security status of the downlink data packet is both integrity protection and encryption protection enabled, the security status of the target secure tunnel is both integrity protection and encryption protection enabled; (3) if the PDCP layer security status of the downlink data packet is integrity protection enabled and encryption protection disabled, the security status of the target secure tunnel is integrity protection enabled and encryption protection disabled; and (4) if the PDCP layer security status of the downlink data packet is integrity protection disabled and encryption protection enabled, the security status of the target secure tunnel is integrity protection disabled and encryption protection enabled.

According to a sixth aspect, an apparatus is provided, including a processor and a communications interface. When the processor executes instructions, the apparatus is enabled to implement the communications method according to any design in the second aspect or the third aspect. Optionally, the apparatus further includes the communications interface, and the communications interface is used by the apparatus to communicate with another device.

According to a seventh aspect, a computer-readable storage medium is provided. The computer-readable storage medium stores instructions, and when the instructions are run on a computer, the computer is enabled to perform the communications method according to any design in the second aspect or the third aspect.

According to an eighth aspect, a computer program product including instructions is provided. When the computer program product runs on a computer, the computer is enabled to perform the communications method according to any design in the second aspect or the third aspect.

According to a ninth aspect, a chip is provided. The chip includes a processor, and when the processor executes instructions, the processor is configured to perform the communications method according to any design in the second aspect or the third aspect. The instructions may be from a memory inside the chip, or may be from a memory outside the chip. Optionally, the chip further includes an input/output circuit that may be used as a communications interface.

For technical effects brought by any design in the fourth aspect to the ninth aspect, refer to technical effects brought by different designs in the second aspect or the third aspect. Details are not described herein again.

This application further provides a communications method and apparatus, to reduce verification operations that need to be performed by a data management network element, and reduce processing load of the data management network element. For specific content, refer to descriptions in any one of a tenth aspect to an eighteenth aspect.

Part 2

According to a tenth aspect, a communications system is provided, including a mobility management network element, an authentication service network element, and a data management network element. The mobility management network element is configured to: receive a registration request message from a communications device; and send a first authentication request message to the authentication service network element, where when the registration request message includes first indication information, the first authentication request message includes the first indication information. The authentication service network element is configured to: receive the first authentication request message; and send a second authentication request message to the data management network element, where when the first authentication request message includes the first indication information, the second authentication request message includes the first indication information. The data management network element is configured to: when the second authentication request message includes the first indication information, query whether an identifier of the communications device is in a preset list; and if the identifier of the communications device is in the preset list, determine that the communications device is an IAB node; or if the identifier of the communications device is not in the preset list, determine that the communications device is a terminal.

According to the technical solutions in this application, only when the second authentication request message includes the first indication information, the data management network element needs to query whether the identifier of the communications device is in the preset list, to determine whether the communications device is an IAB node. When the second authentication request message does not include the first indication information, the data management network element may determine that the communications device accessing a network is a common terminal. In other words, the data management network element needs to perform query operations for only some communications devices. In an actual application scenario, most communications devices that access a network are terminals, and a registration request reported by a terminal usually does not include first indication information. Therefore, according to the technical solutions provided in the embodiments of this application, query operations that need to be performed by the data management network element can be effectively reduced, so that processing load of the data management network element is lightened.

In a possible design, the data management network element is further configured to: when the second authentication request message does not include the first indication information, determine that the communications device is a terminal.

According to an eleventh aspect, a communications method is provided, including: A data management network element receives a second authentication request message, where the second authentication request message includes a user identifier of a communications device; when the second authentication request message includes first indication information, the data management network element queries whether the identifier of the communications device is in a preset list; and if the identifier of the communications device is in the preset list, the data management network element determines that the communications device is an IAB node; or if the identifier of the communications device is not in the preset list, the data management network element determines that the communications device is a terminal.

In a possible design, when the second authentication request message does not include the first indication information, the data management network element determines that the communications device is a terminal.

According to a twelfth aspect, a communications apparatus is provided, including: a communications module, configured to receive a second authentication request message, where the second authentication request message includes a user identifier of a communications device; and a processing module, configured to: when the second authentication request message includes first indication information, query whether the identifier of the communications device is in a preset list; and if the identifier of the communications device is in the preset list, determine that the communications device is an IAB node; or if the identifier of the communications device is not in the preset list, determine that the communications device is a terminal.

In a possible design, the processing module is further configured to: when the second authentication request message does not include the first indication information, determine that the communications device is a terminal.

According to a thirteenth aspect, a communications apparatus is provided, including a processor and a communications interface. When the processor executes computer program instructions, the communications apparatus is enabled to implement the communications method according to any design in the eleventh aspect. Optionally, the apparatus further includes the communications interface, and the communications interface is used by the apparatus to communicate with another device.

According to a fourteenth aspect, a computer-readable storage medium is provided. The computer-readable storage medium stores instructions, and when the instructions are run on a computer, the computer is enabled to perform the communications method according to any design in the eleventh aspect.

According to a fifteenth aspect, a computer program product including instructions is provided. When the computer program product runs on a computer, the computer is enabled to perform the communications method according to any design in the eleventh aspect.

According to a sixteenth aspect, a chip is provided. The chip includes a processor, and when the processor executes instructions, the processor is configured to perform the communications method according to any design in the eleventh aspect. The instructions may be from a memory inside the chip, or may be from a memory outside the chip. Optionally, the chip further includes an input/output circuit that may be used as a communications interface.

For technical effects brought by any design in the twelfth aspect to the sixteenth aspect, refer to technical effects brought by different designs in the eleventh aspect. Details are not described herein again.

Part 3

According to a seventeenth aspect, a communications method is provided, including: A data management network element determines that a communications device is an IAB node; and the data management network element sends second indication information to a mobility management network element in a primary authentication procedure, where the second indication information is used to determine that the communications device is the IAB node. The technical solutions of this application specify a time and a manner in which the data management network element sends IAB authorized to the mobility management network element, so that before the primary authentication procedure ends, the mobility management network element can learn whether the communications device is the IAB node.

In a possible design, the second indication information is carried in a second authentication response message or an authentication information answer command message. It may be understood that the second indication information is carried in existing signaling of the primary authentication procedure. This helps reduce signaling overheads.

According to an eighteenth aspect, a communications apparatus is provided, including: a processing module, configured to determine that a communications device is an IAB node; and a communications module, configured to send second indication information to a mobility management network element in a primary authentication procedure, where the second indication information is used to determine that the communications device is the IAB node.

In a possible design, the second indication information is carried in a second authentication response message or an authentication information answer command message.

According to a nineteenth aspect, a communications apparatus is provided, including a processor and a communications interface. When the processor executes computer program instructions, the communications apparatus is enabled to implement the communications method according to any design in the seventeenth aspect. Optionally, the apparatus further includes the communications interface, and the communications interface is used by the apparatus to communicate with another device.

According to a twentieth aspect, a computer-readable storage medium is provided. The computer-readable storage medium stores instructions, and when the instructions are run on a computer, the computer is enabled to perform the communications method according to any design in the seventeenth aspect.

According to a twenty-first aspect, a computer program product including instructions is provided. When the computer program product runs on a computer, the computer is enabled to perform the communications method according to any design in the seventeenth aspect.

According to a twenty-second aspect, a chip is provided. The chip includes a processor, and when the processor executes instructions, the processor is configured to perform the communications method according to any design in the seventeenth aspect. The instructions may be from a memory inside the chip, or may be from a memory outside the chip. Optionally, the chip further includes an input/output circuit that may be used as a communications interface.

For technical effects brought by any design in the eighteenth aspect to the twenty-second aspect, refer to technical effects brought by different designs in the seventeenth aspect. Details are not described herein again.

DESCRIPTION OF EMBODIMENTS

Figure 1:
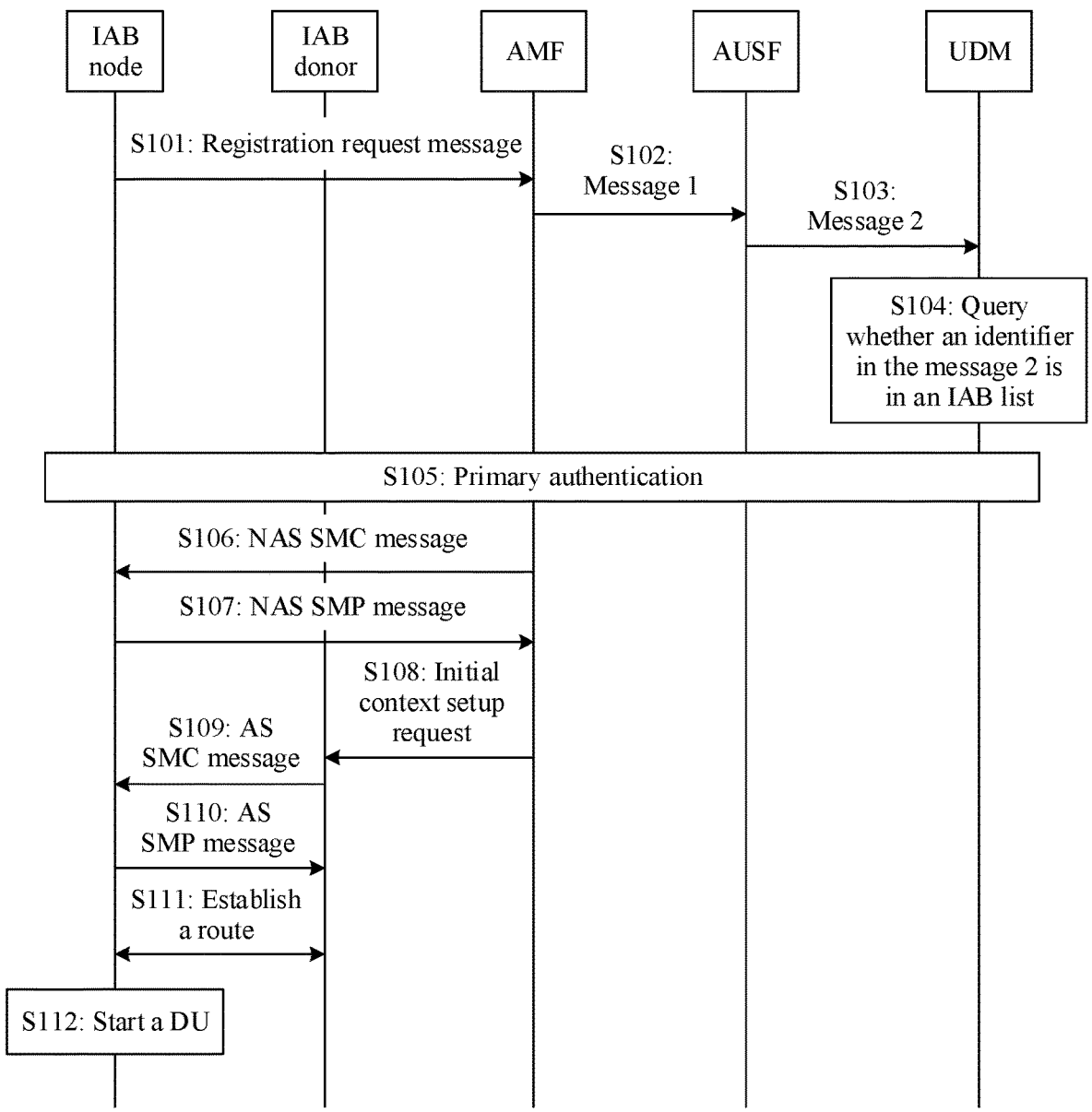
FIG. 1 is a schematic diagram of a start procedure of an IAB node.

In descriptions of this application, unless otherwise specified, "/" means "or". For example, A/B may represent A or B. The term "and/or" in this specification describes only an association relationship for describing associated objects and represents that three relationships may exist. For example, A and/or B may represent the following three cases: Only A exists, both A and B exist, and only B exists. In addition, "at least one" means one or more, and "a plurality of" means two or more. Terms such as "first" and "second" do not limit a quantity or an execution sequence, and the terms such as "first" and "second" do not indicate a definite difference.

It should be noted that in this application, the word such as "example" or "for example" is used to represent giving an example, an illustration, or a description. Any embodiment or design solution described by using "example" or "for example" in this application shall not be construed as being more preferred or more advantageous than another embodiment or design solution. Exactly, use of the word such as "example" or "for example" is intended to present a related concept in a specific manner.

In the descriptions of this application, the "indication" may include a direct indication and an indirect indication, or may include an explicit indication and an implicit indication. Information indicated by a piece of information (such as first indication information or second indication information described below) is referred to as to-be-indicated information. In a specific implementation process, there are a plurality of manners of indicating the to-be-indicated information. For example, the to-be-indicated information may be directly indicated, where the to-be-indicated information, an index of the to-be-indicated information, or the like is indicated. For another example, the to-be-indicated information may be indirectly indicated by indicating other information, and there is an association relationship between the other information and the to-be-indicated information.

For another example, only a part of the to-be-indicated information may be indicated, and the other part of the to-be-indicated information is already known or pre-agreed on. In addition, specific information may also be indicated by using a pre-agreed (for example, stipulated in a protocol) arrangement sequence of various pieces of information, to reduce indication overheads to some extent.

For ease of understanding of the technical solutions in this application, the following describes some technical terms.

1. Encryption Protection

The encryption protection is used to protect confidentiality of data during transmission (and therefore may also be referred to as confidentiality protection). The confidentiality means that real content cannot be directly seen. Usually, the encryption protection may be implemented by encrypting data by using a key and an encryption algorithm. For a specific encryption protection method, refer to related descriptions of the standard in section 8.2 in 3GPP TS 33.401 f50 or section 6.4.4 in 33.501 f50. Details are not described herein.

2. Integrity Protection/Check

The integrity protection/check is used to determine whether content of a message is modified during transmission, and may also be used for identity authentication to determine a source of the message. The integrity check and protection require a message authentication code (MAC). For a specific integrity protection and check method, refer to related descriptions of the standard in section 8.1 in 3GPP TS 33.401 f50 or section 6.4.3 in 33.501 f50. Details are not described herein.

3. Identifier of a Communications Device

In a 5G network, the identifier of the communications device may be a subscription permanent identifier, a subscription concealed identifier (SUCI), or a 5G globally unique temporary identity (5G-GUTI).

It should be noted that the SUPI is used to represent a real identity of a subscriber, and has a function similar to that of an international mobile subscriber identity (IMSI) in LTE.

The SUCI is generated by encrypting the SUPI by using a public key. The SUCI is transmitted between a network device and a terminal. This can avoid a problem that the SUPI transmitted in plaintext is stolen by an attacker. It may be understood that the SUCI may be decrypted by using a private key paired with the public key, to obtain the SUCI.

For ease of understanding of the technical solutions in this application, the following first describes a start procedure of an IAB node in the current technology.

As shown in FIG. 1, the start procedure of the IAB node includes the following steps.

S101: The IAB node sends a registration request message to an access and mobility management function (AMF).

The registration request message includes identity information of the IAB node, for example, an SUCI or a 5G-GUTI.

It may be understood that the AMF is integrated with a security anchor function (SEAF) network element.

S102: The AMF sends a message 1 to an authentication server function (AUSF).

The message 1 may include an SUCI/SUPI and a serving network name (SN name).

For example, the message 1 may be Nausf_UEAuthentication_Authenticate Request.

S103: The AUSF sends a message 2 to a unified data management (UDM).

It may be understood that the UDM is integrated with an authentication credential repository and processing function (ARPF) network element.

The message 2 may include the SUCI/SUPI and the SN name.

For example, the message 2 may be Nudm_UEAuthentication_Get Request.

S104: The UDM queries whether an identifier in the message 2 is in an IAB list.

The IAB list is used to record identifiers of one or more IAB nodes.

It may be understood that the identifier in the message 2 is the SUCI/SUPI.

Therefore, when the identifier in the message 2 is in the IAB list, the UDM may determine that a communications device accessing a network is an IAB node. When the identifier in the message 2 is not in the IAB list, the UDM determines that a communications device accessing a network is a common terminal.

S105: The IAB node performs primary authentication with a network side.

S106: The AMF sends anon-access stratum (NAS) security mode command (SMC) message to the IAB node.

S107: The IAB node sends a NAS security mode complete (SMP) message to the AMF.

It may be understood that, based on steps S106 and S107, a NAS security context is set up between the AMF and the IAB node.

S108: The AMF sends an initial context setup request to an IAB donor.

The initial context setup request includes IAB authorized. The IAB authorized is sent by the UDM to the AMF.

It should be noted that a current protocol does not define when the UDM sends the IAB authorized or how the UDM sends the IAB authorized.

S109: The IAB donor sends an access stratum (AS) SMC message to the IAB node.

S110: The IAB node sends an AS SMP message to the IAB donor.

It may be understood that, based on steps S109 and S110, an AS security context is set up between the IAB donor and the IAB node.

S111: The IAB node and the IAB donor establish a route.

For example, the IAB node and the IAB donor establish a secure tunnel.

S112: The IAB node starts a DU.

It should be noted that after the DU of the IAB node is started, the IAB node may provide a transmission service for a terminal or another IAB node.

The start procedure of the IAB node is briefly introduced above. It may be understood that the start procedure of the IAB node may further include another step. This is not limited in the embodiments of this application.

The following describes a primary authentication procedure. It should be noted that there are two types of primary authentication procedures: an extensible authentication protocol (EAP)-AKA' procedure and a 5G-AKA procedure.

Figure 2:
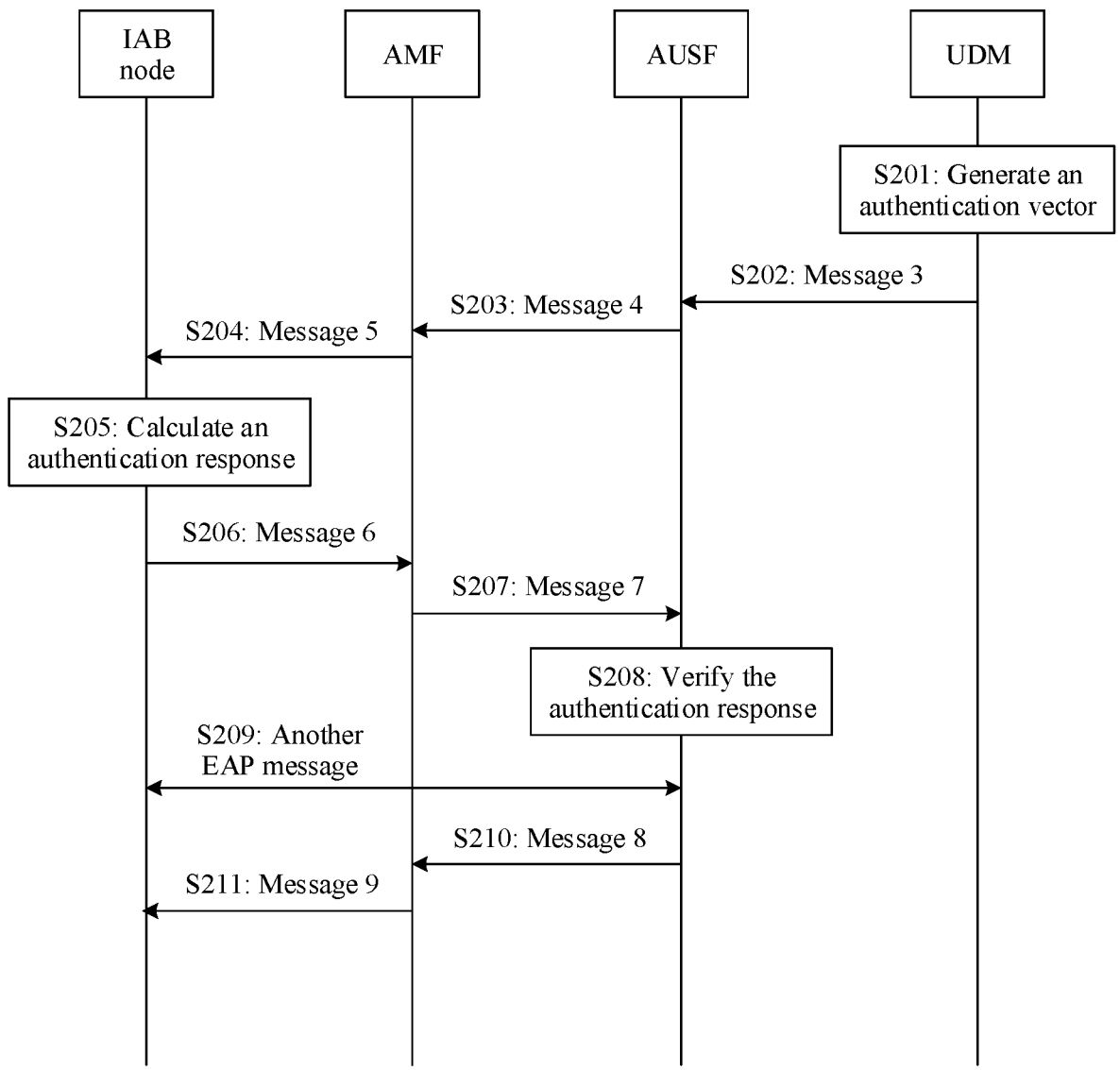
FIG. 2 is a schematic diagram of a primary authentication procedure.

As shown in FIG. 2, the EAP-AKA' procedure includes the following steps.

S201: A UDM generates an authentication vector.

The authentication vector may be AV' (RAND, AUTN, XRES, CK', IK').

S202: The UDM sends a message 3 to an AUSF.

The message 3 may include an authentication vector (EAP-AKA' AV).

For example, the message 3 may be Nudm_UEAuthentication_Get Response.

S203: The AUSF sends a message 4 to an AMF.

The message 4 may include EAP Request/AKA'-Challenge.

For example, the message 4 may be Nausf_UEAuthentication_Authenticate Response.

S204: The AMF sends a message 5 to an IAB node.

The message 5 may include EAP Request/AKA'-Challenge, ngKS, and ABBA.

For example, the message 5 may be Auth-Req.

S205: The IAB node calculates an authentication response.

S206: The IAB node sends a message 6 to the AMF.

The message 6 may include EAP Response/AKA'-Challenge.

For example, the message 6 may be Auth-Resp.

S207: The AMF sends a message 7 to the AUSF.

The message 7 may include EAP Response/AKA'-Challenge.

For example, the message 7 may be Nausf_UEAuthentication_Authenticate Request.

S208: The AUSF verifies the authentication response.

S209 (optional): The IAB node exchanges another EAP message with the AUSF.

When authentication succeeds, the following steps S210 and S211 may be performed.

S210: The AUSF sends a message 8 to the AMF.

The message 8 may include EAP Success||Anchor Key.

For example, the message 8 may be Nausf_UEAuthentication_Authenticate Response.

S211: The AMF sends a message 9 to the IAB node.

The message 9 may include EAP Success, ngKSI, and ABBA.

For example, the message 9 may be an N1 message.

The EAP-AKA' procedure is briefly introduced above. For a specific description of the EAP-AKA' procedure, refer to the current technology.

Figure 3:
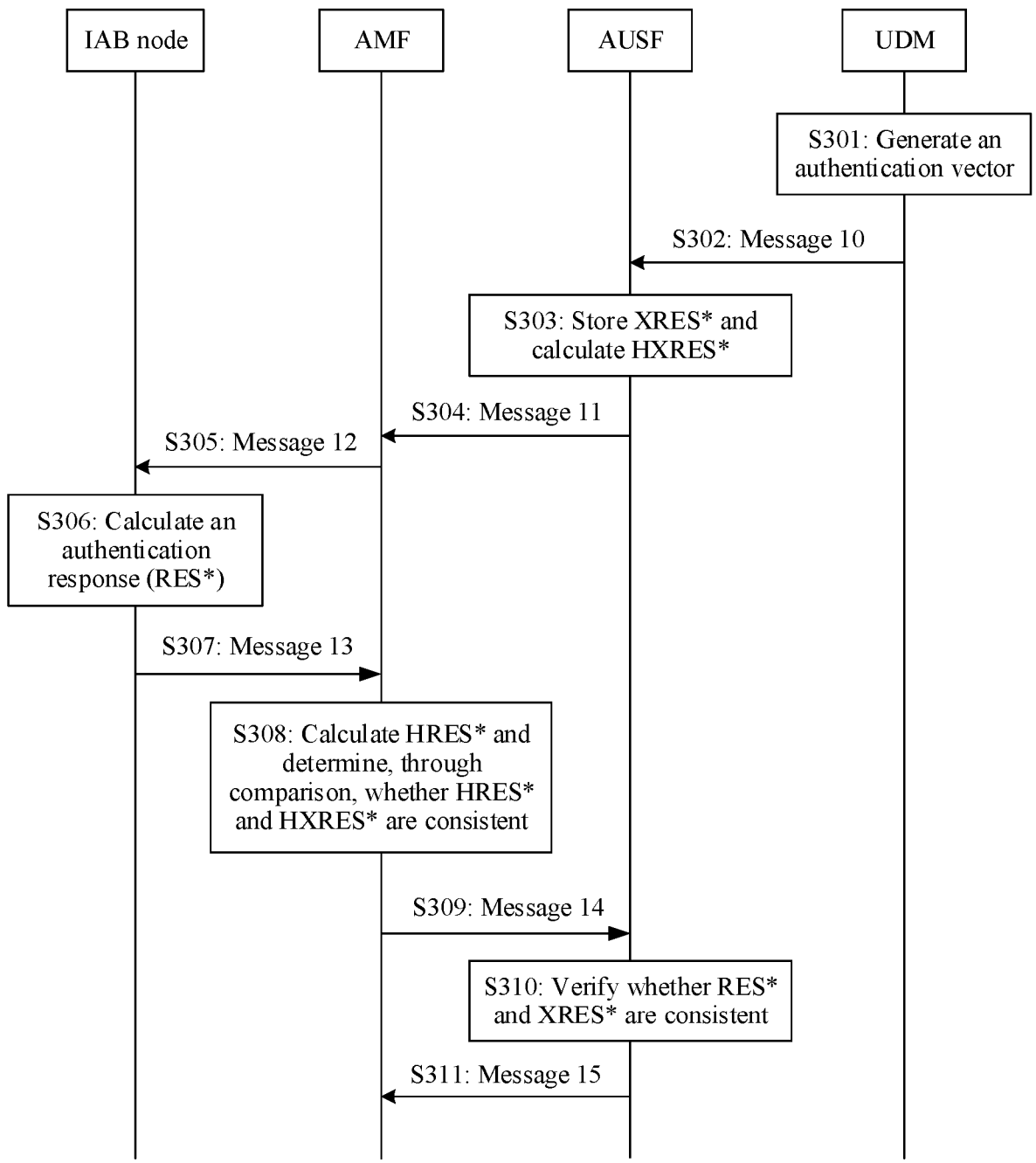
FIG. 3 is a schematic diagram of another primary authentication procedure.

As shown in FIG. 3, the 5G-AKA procedure includes the following steps.

S301: A UDM generates an authentication vector.

S302: The UDM sends a message 10 to an AUSF.

The message 10 may include 5G HE AV.

For example, the message 10 may be Nudm_Authentication_Get Response.

S303: The AUSF stores XRES* and calculates HXRES*.

S304: The AUSF sends a message 11 to an AMF.

The message 11 may include 5G SE AV.

For example, the message 11 may be Nausf_UEAuthentication_Authenticate Response.

S305: The AMF sends a message 12 to an IAB node.

For example, the message 12 may be Authentication Request.

S306: The IAB node calculates an authentication response (RES*).

S307: The IAB node sends a message 13 to the AMF.

For example, the message 13 may be Authentication Response.

S308: The AMF calculates HRES* and determines, through comparison, whether HRES* and HXRES* are consistent.

S309: The AMF sends a message 14 to the AUSF.

The message 14 may include RES*.

For example, the message 14 may be Nausf_UEAuthentication_Authenticate Request.

S310: The AUSF verifies whether RES* and XRES* are consistent.

S311: The AUSF sends a message 15 to the AMF.

The message 15 may include an authentication result and Kseaf.

For example, the message 15 may be Nausf_UEAuthentication_Authenticate Response.

The 5G-AKA' procedure is briefly introduced above. For a specific description of the 5G-AKA procedure, refer to the current technology.

The technical solutions provided in the embodiments of this application may be applied to various communications systems, for example, a 5G communications system, a future evolved system, or a plurality of converged communications systems.

The technical solutions provided in this application may be applied to a plurality of application scenarios, for example, scenarios such as machine to machine (M2M), macro-micro communication, enhanced mobile broadband (eMBB), URLLC, and massive machine type communication (mMTC). These scenarios may include but are not limited to a scenario of communication between communications devices, a scenario of communication between network devices, a scenario of communication between a network device and a communications device, and the like. The following provides descriptions by using an example in which the technical solutions are applied to a scenario of communication between a network device and a terminal.

In addition, network architectures and service scenarios described in the embodiments of this application are intended to describe the technical solutions in the embodiments of this application more clearly, and do not constitute a limitation on the technical solutions provided in the embodiments of this application. A person of ordinary skill in the art may learn that with evolution of the network architectures and emergence of new service scenarios, the technical solutions provided in the embodiments of this application are also applicable to similar technical problems.

Figure 4:
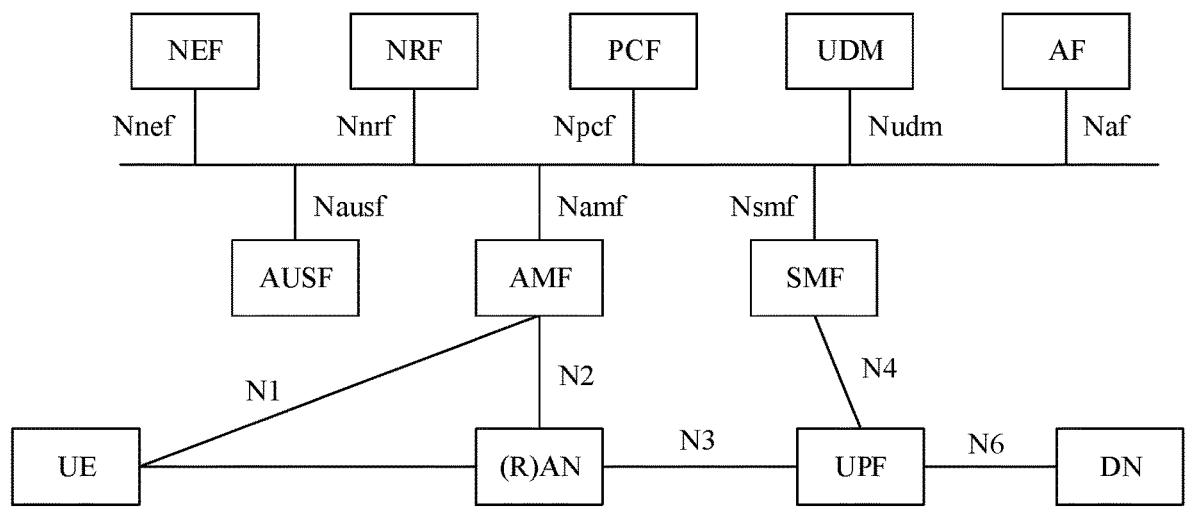
FIG. 4 is a schematic diagram of an architecture of a 5G network according to an embodiment of this application.

FIG. 4 shows an architecture of a 5G network to which the technical solutions provided in the embodiments of this application are applicable. The 5G network may include a terminal, a radio access network (RAN) or an access network (AN) (where the RAN and the AN are collectively referred to as a (R)AN below), a core network (CN), and a data network (DN).

The terminal may be a device with wireless sending and receiving functions. The terminal may have different names, for example, user equipment (UE), an access terminal, a terminal unit, a terminal station, a mobile station, a mobile console, a remote station, a remote terminal, a mobile device, a wireless communications device, a terminal agent, or a terminal apparatus. The terminal may be deployed on land and includes an indoor or outdoor device, a handheld device, or a vehicle-mounted device; or may be deployed on a water surface (for example, on a ship); or may be deployed in the air (for example, on an aircraft, a balloon, or a satellite). The terminal includes a handheld device, a vehicle-mounted device, a wearable device, or a computing device that has a wireless communication function. For example, the terminal may be a mobile phone, a tablet computer, or a computer having wireless sending and receiving functions. Alternatively, the terminal device may be a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in a smart city, a wireless terminal in a smart home, or the like. In the embodiments of this application, an apparatus for implementing a function of the terminal may be a terminal, or may be an apparatus that can support the terminal in implementing the function, for example, a chip system. In the embodiments of this application, the chip system may include a chip, or may include a chip and another discrete component. In the embodiments of this application, an example in which the apparatus for implementing the function of the terminal is the terminal is used to describe the technical solutions provided in the embodiments of this application.

An access network device may also be referred to as a base station. There may be various forms of base stations, for example, a macro base station, a micro base station (also referred to as a small cell), a relay station, and an access point. The base station may be specifically an access point (AP) in a wireless local area network (WLAN), a base transceiver station (BTS) in a global system for mobile communications (GSM) or code division multiple access (CDMA), a NodeB (NB) in wideband code division multiple access (WCDMA), an evolved NodeB (eNB or eNodeB), a relay station, an access point, a vehicle-mounted device, or a wearable device in LTE, a next generation NodeB (gNB) in a future 5G network, a base station in a future evolved public land mobile network (PLMN), or the like.

The base station usually includes a baseband unit (BBU), a remote radio unit (RRU), an antenna, and a feeder used to connect the RRU and the antenna. The BBU is configured to be responsible for signal modulation. The RRU is configured to be responsible for radio frequency processing. The antenna is configured to be responsible for conversion between a pilot wave on a cable and a space wave in the air. A distributed base station greatly shortens a length of the feeder between the RRU and the antenna, so that a signal loss can be reduced, and costs of the feeder can be reduced. In addition, the RRU and the antenna are relatively small and can be installed anywhere, making network planning more flexible. The RRU may be remotely placed. In addition, all BBUs may be centralized and placed in a central office (CO). In this centralized manner, a quantity of base station equipment rooms can be greatly reduced, energy consumption of auxiliary devices, especially air conditioners, can be reduced, and carbon emissions can be greatly reduced. In addition, after distributed BBUs are centralized into a BBU baseband pool, the BBUs can be managed and scheduled centrally, and resources can be allocated more flexibly. In this mode, all physical base stations evolve into virtual base stations. All the virtual base stations share information such as data sent and received by users and channel quality in the BBU baseband pool, and cooperate with each other, to implement joint scheduling.

In some deployments, the base station may include a centralized unit (CU) and a distributed unit (DU). The base station may further include an active antenna unit (AAU). The CU implements some functions of the base station, and the DU implements some functions of the base station. For example, the CU is responsible for processing a non-real-time protocol and service, and implementing functions of a radio resource control (RRC) layer and a packet data convergence protocol (PDCP) layer. The DU is responsible for processing a physical layer protocol and a real-time service, and implementing functions of a radio link control (RLC) layer, a media access control (MAC) layer, and a physical (PHY) layer. The AAU implements some physical layer processing functions, radio frequency processing, and a function related to an active antenna. Information at the RRC layer eventually becomes information at the PHY layer, or is converted from information at the PHY layer. Therefore, in this architecture, higher layer signaling, for example, RRC layer signaling or PDCP layer signaling, may also be considered as being sent by the DU or sent by the DU and the AAU. It may be understood that, in the embodiments of this application, the access network device may be a device including one or more of a CU node, a DU node, and an AAU node. In addition, the CU may be classified as a network device in a RAN, or the CU may be classified as a network device in a core network (CN). This is not limited herein.

In a possible design, for the base station, a control plane (CP) and a user plane (UP) of the CU may be further separated and implemented by using different entities. In other words, the CU may be divided into a CU-CP and a CU-UP.

The core network includes a plurality of core network elements (or referred to as network function network elements), for example, an AMF network element, a security anchor function (SEAF) network element, a session management function (SMF) network element, a policy control function (PCF) network element, a user plane function (UPF) network element, an application function network element, an AUSF network element, and a UDM network element. In addition, the core network may further include some other network elements that are not shown. Details are not described in the embodiments of this application.

In addition, the core network may further include some network elements that are not shown in FIG. 4, for example, a security anchor function (SEAF) network element and an ARPF network element. Details are not described in the embodiments of this application.

The UDM network element is configured to store subscription information of a user, generate an authentication parameter, and so on. The unified data management supports functions such as 3GPP authentication, a user identity operation, permission grant, registration, and mobility management.

The ARPF network element has an authentication credential repository and processing function, and is configured to store a long-term authentication credential of the user, for example, a permanent key K. In 5G, the function of the ARPF network element may be combined into the UDM network element.

The SEAF network element is configured to complete authentication on UE. In 5G, a function of the SEAF may be combined into the AMF.

The AUSF network element has an authentication server function, and is configured to terminate an authentication function requested by the SEAF network element. In an authentication process, the AUSF network element receives an authentication vector sent by the UDM, processes the authentication vector, and sends a processed authentication vector to the SEAF.

The AMF network element is mainly responsible for mobility management processing, for example, functions such as access control, mobility management, attachment and detachment, and SMF selection. When providing a service for a session in the terminal, the AMF network element provides a control plane storage resource for the session, to store a session identifier, an SMF identifier associated with the session identifier, and the like.

It should be noted that the foregoing core network elements may have other names. The embodiments of this application are not limited thereto. For example, the AMF network element may also be referred to as an AMF or an AMF entity for short, and the UPF network element may also be referred to as a UPF or a UPF entity for short.

The terminal communicates with the AMF by using a next generation (N) 1 interface (N1), the RAN device communicates with the AMF by using an N2 interface (N2), the RAN device communicates with the UPF by using an N3 interface (N3), and the UPF communicates with the DN by using an N6 interface (N6).

Control plane network elements, such as the AMF, the SMF, the UDM, the AUSF, or the PCF, can also interact with each other by using service-oriented interfaces. For example, as shown in FIG. 4, a service-oriented interface externally provided by the AMF may be Namf, a service-oriented interface externally provided by the SMF may be Nsmf, a service-oriented interface externally provided by the UDM may be Nudm, a service-oriented interface externally provided by the PCF may be Npcf, and a service-oriented interface externally provided by the AUSF may be Nausf. Details are not described herein one by one.

Figure 5:
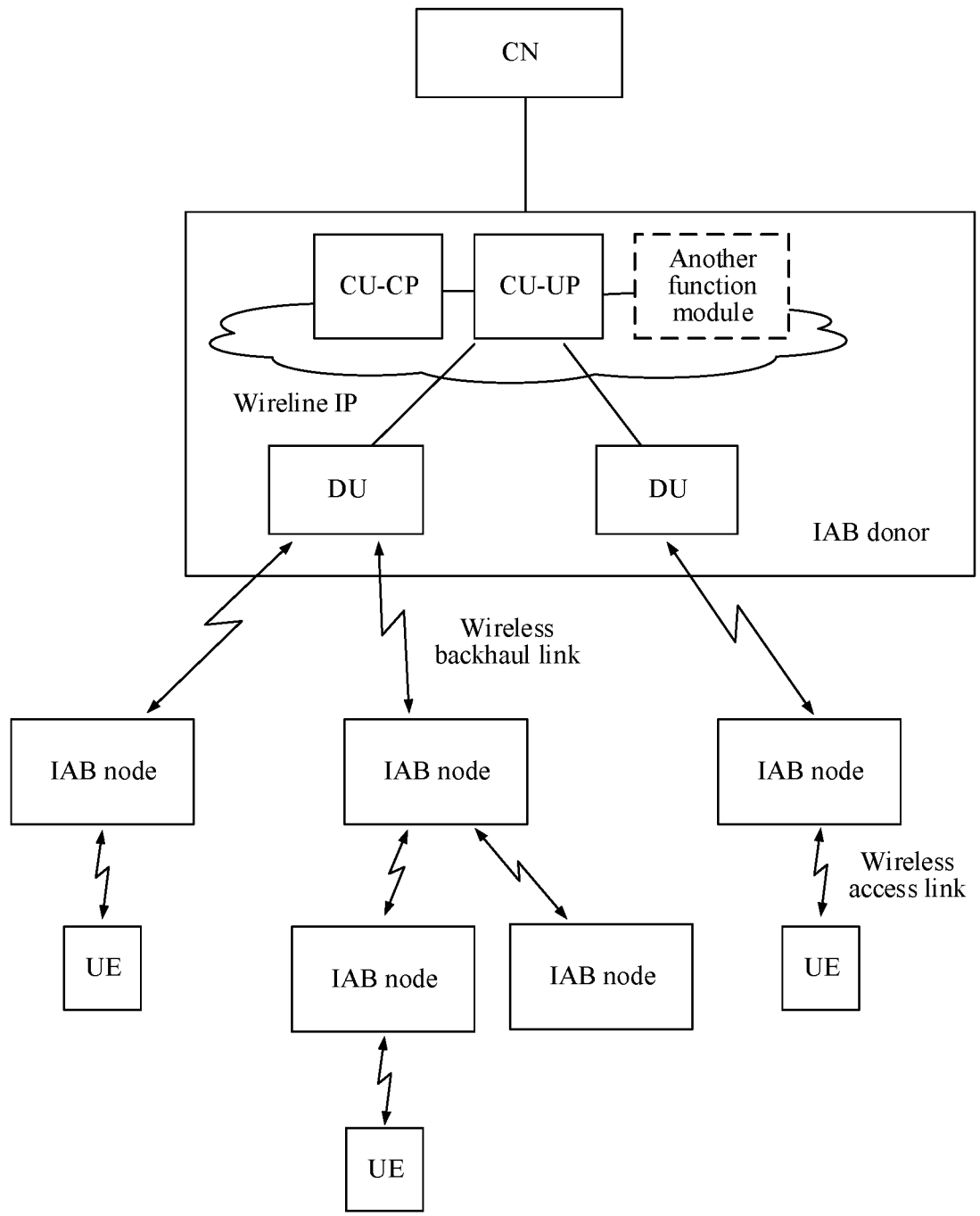
FIG. 5 is a schematic diagram of an IAB architecture according to an embodiment of this application.

For the purpose of lightening construction load of a wired transmission network and providing flexible and dense NR deployment, an IAB technology is put forward in 5G NR. FIG. 5 is a schematic diagram of an IAB architecture according to an embodiment of this application. As shown in FIG. 5, an access network using the IAB technology may include an IAB node and an IAB donor.

The IAB donor has a function similar to that of a conventional gNB, and is configured to provide an interface of a core network. However, the IAB donor further supports a wireless backhaul function of the IAB node. The IAB donor includes a CU and a DU. The CU may be further divided into a CU-UP, a CU-CP, and another function module.

A wireless access link and a wireless backhaul link are integrated into the IAB node. Therefore, the IAB node can support wireless access of a terminal and wireless backhaul of data. The IAB node may include a mobile terminal (MT) and a DU. The MT is configured to support a mobile terminal function of the IAB node, and assist the IAB node in performing network access authentication and setting up communication security.

Figure 6:
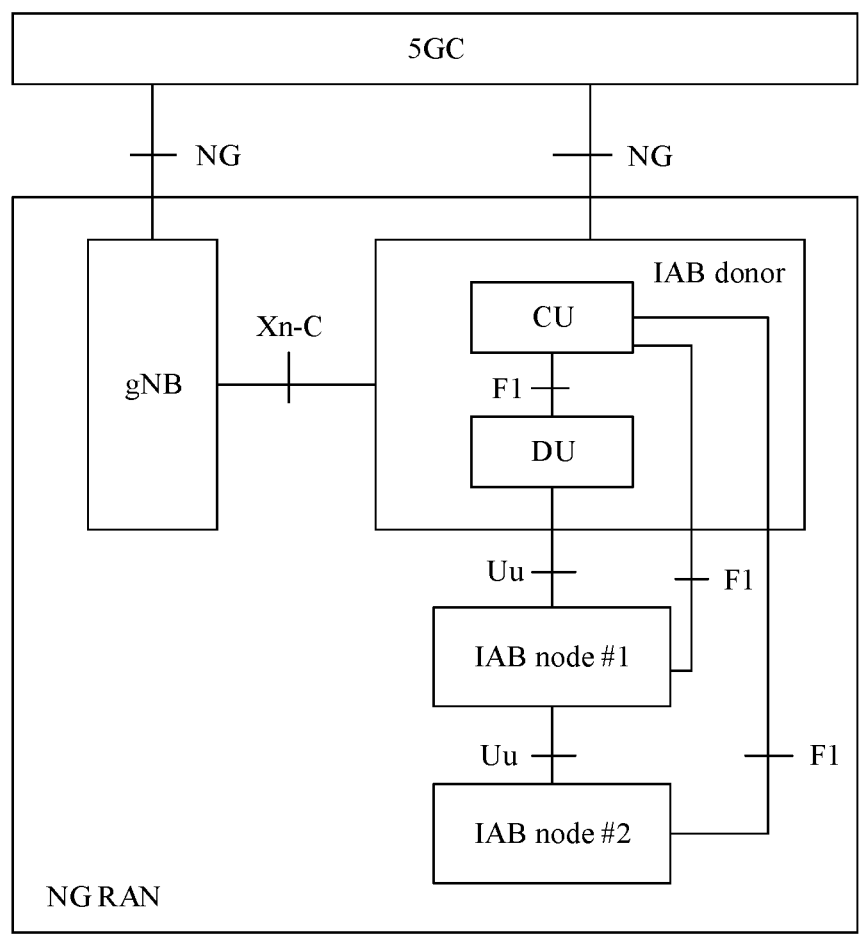
FIG. 6 is a schematic diagram of another IAB architecture according to an embodiment of this application.

As shown in FIG. 6, the IAB node may communicate with the IAB-donor-CU through an F1 interface. The IAB node may communicate with the IAB-donor-DU through a Uu interface. Two different IAB nodes may communicate with each other through a Uu interface. The IAB-donor-CU may be connected to a core network through an NG interface. The IAB-donor-CU may be connected to a gNB through an Xn-c interface.

It should be noted that, in a 5G network or another future network, all of the foregoing interfaces, such as the F1 interface and the Uu interface, may have other names. This is not limited in the embodiments of this application.

Figure 7:
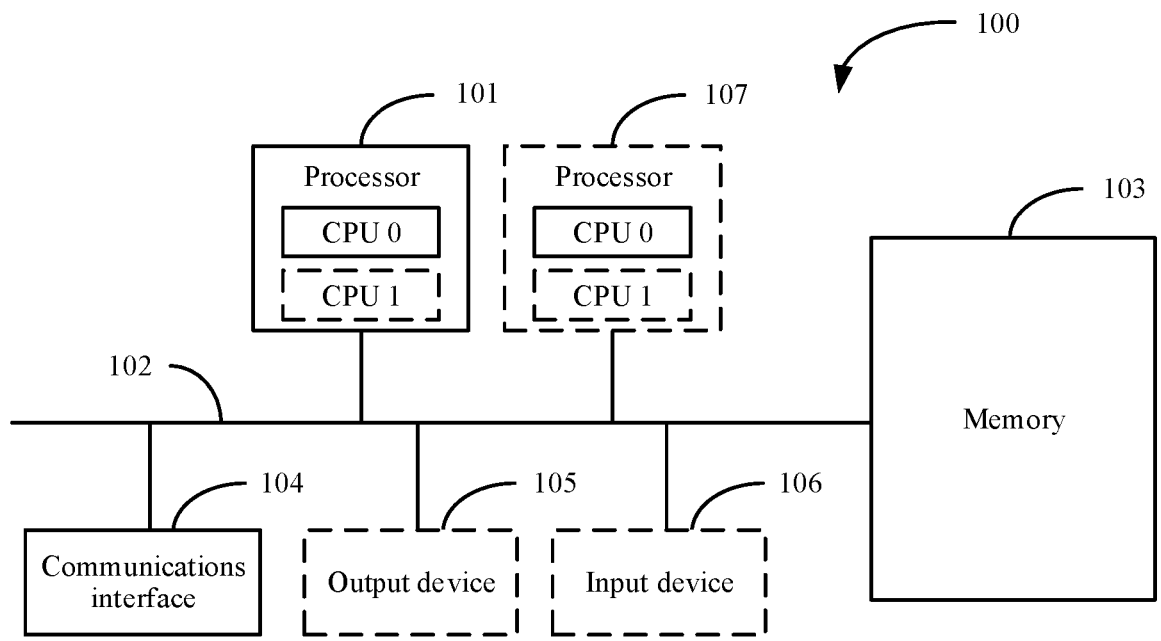
FIG. 7 is a schematic diagram of a hardware structure of an apparatus according to an embodiment of this application.

Optionally, the devices mentioned in the embodiments of this application, such as the IAB node, the IAB donor, the terminal, and the core network element, each may be implemented by using a communications apparatus shown in FIG. 7.

As shown in FIG. 7, the apparatus 100 includes at least one processor 101, a communications line 102, a memory 103, and at least one communications interface 104.

The processor 101 may be a general-purpose central processing unit (CPU), a microprocessor, an application-specific integrated circuit (ASIC), or one or more integrated circuits configured to control program execution of the solutions of this application.

The communications line 102 may include a path on which information is transferred between the foregoing components.

The communications interface 104 is configured to communicate with another device or a communications network, such as an Ethernet, a radio access network (RAN), or a wireless local area network (WLAN), via any apparatus such as a transceiver.

The memory 103 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile optical disc, a blue-ray optical disc, or the like), a magnetic disk storage medium or another magnetic storage device, or any other medium capable of carrying or storing program code in a form of instructions or data structures and capable of being accessed by a computer, but is not limited thereto. The memory may exist independently, and is connected to the processor through the communications line 102. Alternatively, the memory may be integrated with the processor.

The memory 103 is configured to store computer-executable instructions for executing the solutions of this application, and the processor 101 controls the execution. The processor 101 is configured to execute the computer-executable instructions stored in the memory 103, to implement a communications method provided in the following embodiments of this application.

Optionally, the computer-executable instructions in the embodiments of this application may also be referred to as application program code. This is not specifically limited in the embodiments of this application.

During specific implementation, in an embodiment, the processor 101 may include one or more CPUs, for example, a CPU 0 and a CPU 1 in FIG. 7.

During specific implementation, in an embodiment, the apparatus 100 may include a plurality of processors, for example, the processor 101 and a processor 107 in FIG. 7. Each of the processors may be a single-core (single-CPU) processor or a multi-core (multi-CPU) processor. The processor herein may refer to one or more devices, circuits, and/or processing cores configured to process data (for example, computer program instructions).

During specific implementation, in an embodiment, the apparatus 100 may further include an output device 105 and an input device 106. The output device 105 communicates with the processor 101, and may display information in a plurality of manners. For example, the output device 105 may be a liquid crystal display (LCD), a light-emitting diode (LED) display device, a cathode ray tube (CRT) display device, or a projector. The input device 106 communicates with the processor 101, and may receive an input from a user in a plurality of manners. For example, the input device 106 may be a mouse, a keyboard, a touchscreen device, or a sensor device.

The following specifically describes the technical solutions provided in the embodiments of this application with reference to accompanying drawings of the specification.

Embodiment 1

With reference to FIG. 1, in the current technology, when any communications device is to access a network, a UDM needs to query whether an identifier of the communications device is in an IAB list, to identify whether the communications device is an IAB node. This causes relatively high query overheads of the UDM.

Figure 8:
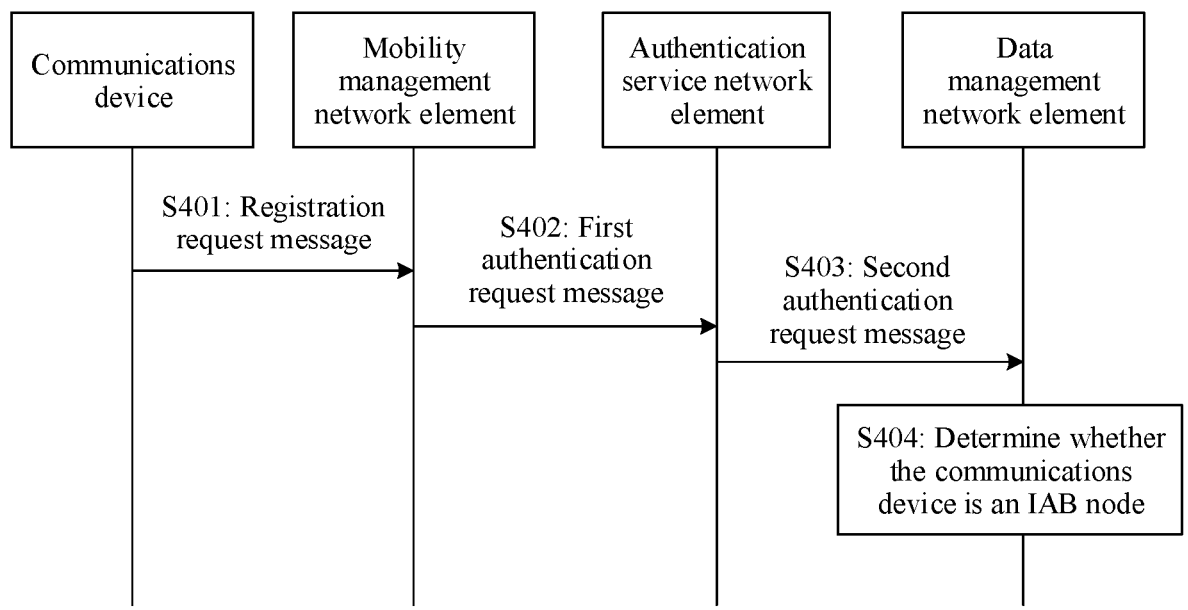
FIG. 8 is a flowchart of a communications method according to an embodiment of this application.

To resolve the foregoing technical problem, an embodiment of this application provides a communications method. As shown in FIG. 8, the communications method includes the following steps.

S401: A communications device sends a registration request message to a mobility management network element, so that the mobility management network element receives the registration request message from the communications device.

For example, in a 5G network, the mobility management network element is an AMF. Unified descriptions are provided herein, and are not described below again.

The registration request message is used to request to register with a network. The registration request message may include an identifier of the communications device, for example, an SUCI or an SUPI. For example, the registration request message may be carried in an N1 interface message.

In the embodiments of this application, the communications device may be an IAB node.

Optionally, the registration request message may include first indication information, and the first indication information is used to indicate that the communications device is an IAB node. Optionally, the first indication information may be denoted as an IAB indicator.

S402: The mobility management network element sends a first authentication request message to an authentication service network element, so that the authentication service network element receives the first authentication request message sent by the mobility management network element.

For example, in a 5G network, the authentication service network element is an AUSE Unified descriptions are provided herein, and are not described below again.

The first authentication request message is used to request to perform authentication on the communications device. The first authentication request message may include the identifier of the communications device. Certainly, the first authentication request message may further include another parameter. The embodiments of this application are not limited thereto.

For example, the first authentication request message may be Nausf_UEAuthentication_Authenticate Request.

It may be understood that, if the registration request message received by the mobility management network element includes the first indication information, the first authentication request message sent by the mobility management network element may also include the first indication information.

S403: The authentication service network element sends a second authentication request message to a data management network element, so that the data management network element receives the second authentication request message from the authentication service network element.

For example, in a 5G network, the data management network element is a UDM. Unified descriptions are provided herein, and are not described below again.

The second authentication request message is used to obtain an authentication vector for performing authentication on the communications device. The second authentication request message may include the identifier of the communications device. Certainly, the second authentication request message may further include another parameter. The embodiments of this application are not limited thereto.

For example, the second authentication request message may be Nudm_UEAuthentication_Get Request.

It may be understood that, if the first authentication request message received by the data management network element includes the first indication information, the second authentication request message sent by the data management network element may also include the first indication information.

S404: The data management network element determines whether the communications device is an IAB node.

In an implementation, when the second authentication request message includes the first indication information, the data management network element queries whether the identifier of the communications device is in a preset list. If the identifier of the communications device is in the preset list, the data management network element may determine that the communications device is an IAB node. If the identifier of the communications device is not in the preset list, the data management network element may determine that the communications device is a common terminal.

The preset list is used to record identifiers of one or more IAB nodes. Optionally, the preset list may be implemented in a form of a list. For example, the preset list is an IAB list.

It should be noted that, when the data management network element determines that the communications device is an IAB node, the data management network element should send second indication information to the mobility management network element. The second indication information is used to determine that the communications device is the IAB node. For example, the second indication information may be IAB authorized. The embodiments of this application are not limited thereto.

Optionally, when the second authentication request message does not include the first indication information, the data management network element determines that the communications device is a common terminal. In other words, when the second authentication request message does not include the first indication information, the data management network element does not need to determine whether the communications device is an IAB node.

According to the technical solutions shown in FIG. 8, only when the second authentication request message includes the first indication information, the data management network element needs to query whether the identifier of the communications device is in the preset list, to determine whether the communications device is an IAB node. When the second authentication request message does not include the first indication information, the data management network element may determine that the communications device accessing a network is a common terminal. In other words, the data management network element needs to perform query operations for only some communications devices, so that query operations that need to be performed by the data management network element are reduced.

In an actual application scenario, most communications devices that access a network are terminals, and a registration request reported by a terminal usually does not include first indication information. Therefore, according to the technical solutions provided in the embodiments of this application, query operations that need to be performed by the data management network element can be effectively reduced, so that processing load of the data management network element is lightened.

Embodiment 2

A data management network element determines that a communications device is an IAB node, but the current technology does not define when the data management network element sends IAB authorized to a mobility management network element or how to send the IAB authorized.

Figure 9:
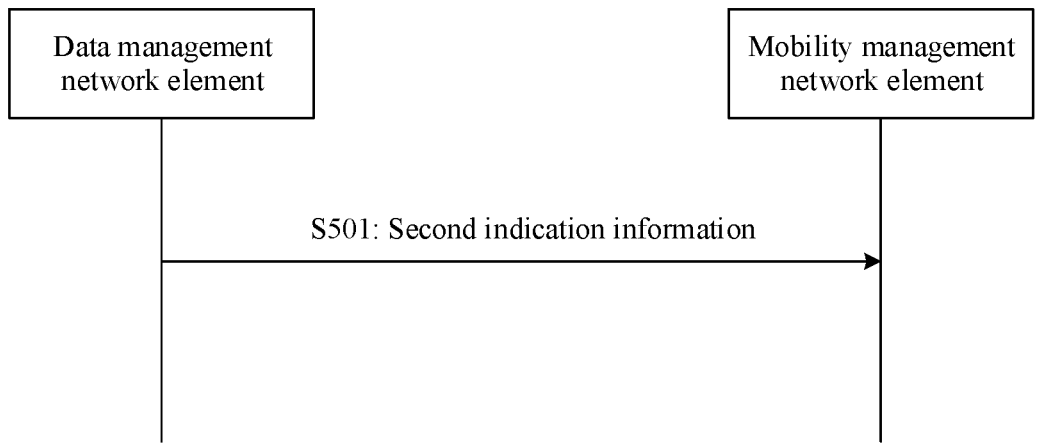
FIG. 9 is a flowchart of another communications method according to an embodiment of this application.

To resolve the foregoing technical problem, an embodiment of this application provides a communications method. As shown in FIG. 9, the communications method includes the following steps.

S501: A data management network element sends IAB authorized to a mobility management network element, so that the mobility management network element receives the IAB authorized from the data management network element.

Implementation 1: The data management network element sends the IAB authorized to the mobility management network element in a primary authentication procedure.

Based on Implementation 1, in a possible design, in the primary authentication procedure, the data management network element sends a second authentication response message to an authentication service network element. After receiving the second authentication response message, the authentication service network element sends a first authentication response message to the mobility management network element. Both the second authentication response message and the first authentication response message include second indication information.

It should be noted that the second authentication response message is used to respond to a second authentication request message. For example, the second authentication response message may be Nudm_UEAuthentication_Get Response.

The first authentication response message is used to respond to a first authentication request message. For example, the first authentication response message may be Nausf_UEAuthentication_Authenticate Response.

Based on Implementation 1, in another possible design, in the primary authentication procedure, the data management network element sends an authentication information answer command message to an authentication service network element, and the authentication information answer command message includes the IAB authorized. Optionally, a new information element may be added to the authentication information answer command message to carry the IAB authorized. Alternatively, an idle flag bit of the authentication information answer command message may be selected to carry the IAB authorized.

For example, the authentication information answer command message may be Authentication-Information-Answer (AIA) Command.

Based on Implementation 1, in another possible design, signaling that carries the IAB authorized may alternatively be newly added signaling in the primary authentication procedure. The embodiments of this application are not limited thereto.

Implementation 2: After primary authentication ends and before a registration procedure ends, the data management network element sends the IAB authorized to the mobility management network element.

Compared with the current technology, the technical solutions shown in FIG. 9 specify a time and a manner in which the data management network element sends the IAB authorized to the mobility management network element, so that the mobility management network element can learn whether a communications device is an IAB node.

Embodiment 3

In the current technology, a procedure in which a mobility management network element learns of a type of a communications device accessing a network is as follows: In a process in which the communications device accesses the network, a data management network element determines whether the communications device is an IAB node, and when the communications device is an IAB node, the data management network element sends the IAB authorized to the mobility management network element, so that the mobility management network element learns that the communications device accessing the network is an IAB node. The foregoing procedure is too cumbersome and needs to be improved.

Figure 10:
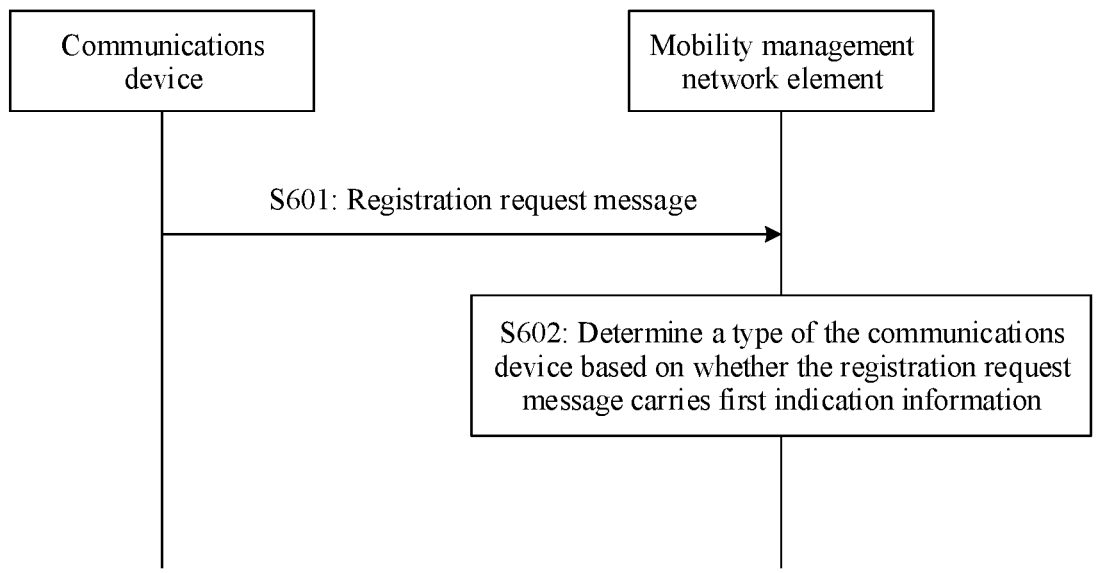
FIG. 10 is a flowchart of another communications method according to an embodiment of this application.

To resolve the foregoing technical problem, an embodiment of this application provides a communications method. As shown in FIG. 10, the communications method includes the following steps.

S601: A communications device sends a registration request message to a mobility management network element, so that the mobility management network element receives the registration request message from the communications device.

If the communications device is a terminal, the registration request message does not include first indication information. If the communications device is a first node, the registration request message may include first indication information. The first indication information is used to indicate that the communications device is the first node. Optionally, the first indication information may be denoted as an IAB indicator.

S602: The mobility management network element determines a type of the communications device based on whether the registration request message carries the first indication information.

Communications device types include common terminal and IAB node.

In an implementation, if the registration request message includes the first indication information, after primary authentication on the communications device succeeds, the mobility management network element determines that the communications device is an IAB node. If the registration request message does not include the first indication information, after primary authentication on the communications device succeeds, the mobility management network element determines that the communications device is a terminal.

It may be understood that, after a primary authentication procedure ends, if the mobility management network element determines that the communications device is an IAB node, the mobility management network element sends an initial context setup request to an IAB donor, where the initial context setup request includes IAB authorized.

According to the technical solutions shown in FIG. 10, when the registration request includes the first indication information, the mobility management network element determines that the communications device is an IAB node. When the registration request does not include the first indication information, the mobility management network element determines that the communications device is a common terminal. Therefore, a data management network element does not need to identify the type of the communications device, and the mobility management network element does not need to learn of the type of the communications device from the data management network element. This simplifies a procedure in which the mobility management network element learns of the type of the communications device.

Embodiment 4

In a 5G network, some services, such as the Internet of vehicles (vehicle to X) and URLLC, require high reliability and a low latency of a network. However, a latency increased due to multi-hop in an IAB network adversely affects performance of user plane data transmission. Therefore, for the IAB network, it is very important to reduce an end-to-end latency between UE and an IAB donor. A lower latency of the IAB network facilitates application of the IAB network to more service scenarios.

Currently, end-to-end security protection is established between an IAB node and the IAB donor. To be specific, a secure tunnel is established between the IAB node and the IAB donor, and integrity protection and encryption protection are enabled for the secure tunnel. In other words, before a data packet is transmitted through the secure tunnel between the IAB node and the IAB donor, the IAB node/IAB donor needs to perform integrity protection and encryption protection on the data packet, to ensure confidentiality and integrity of the data packet in a transmission process.

However, after a terminal accesses the network through the IAB node, end-to-end security protection may also be established between the terminal and the IAB donor. To be specific, a user plane security status is established between the terminal and the IAB donor, so that a data packet transmitted between the terminal and the IAB donor is encryption-protected and integrity-protected at a PDCP layer.

It may be understood that, if the data packet transmitted between the terminal and the IAB donor is correspondingly security-protected at the PDCP layer, security protection on the data packet in a secure tunnel is unnecessary. In other words, a security protection operation performed by the IAB node/IAB donor on the data packet is unnecessary. The foregoing security protection operation refers to encryption calculation and integrity protection calculation performed on the data packet. An unnecessary security protection operation increases a latency of processing the data packet by the IAB node/IAB donor, and consequently, an end-to-end transmission latency of the data packet from the UE to the IAB donor is increased.

For example, the secure tunnel between the IAB node and the IAB donor may be an Internet protocol security (IPsec) tunnel or a tunnel of another type. The embodiments of this application are not limited thereto.

Figure 11:
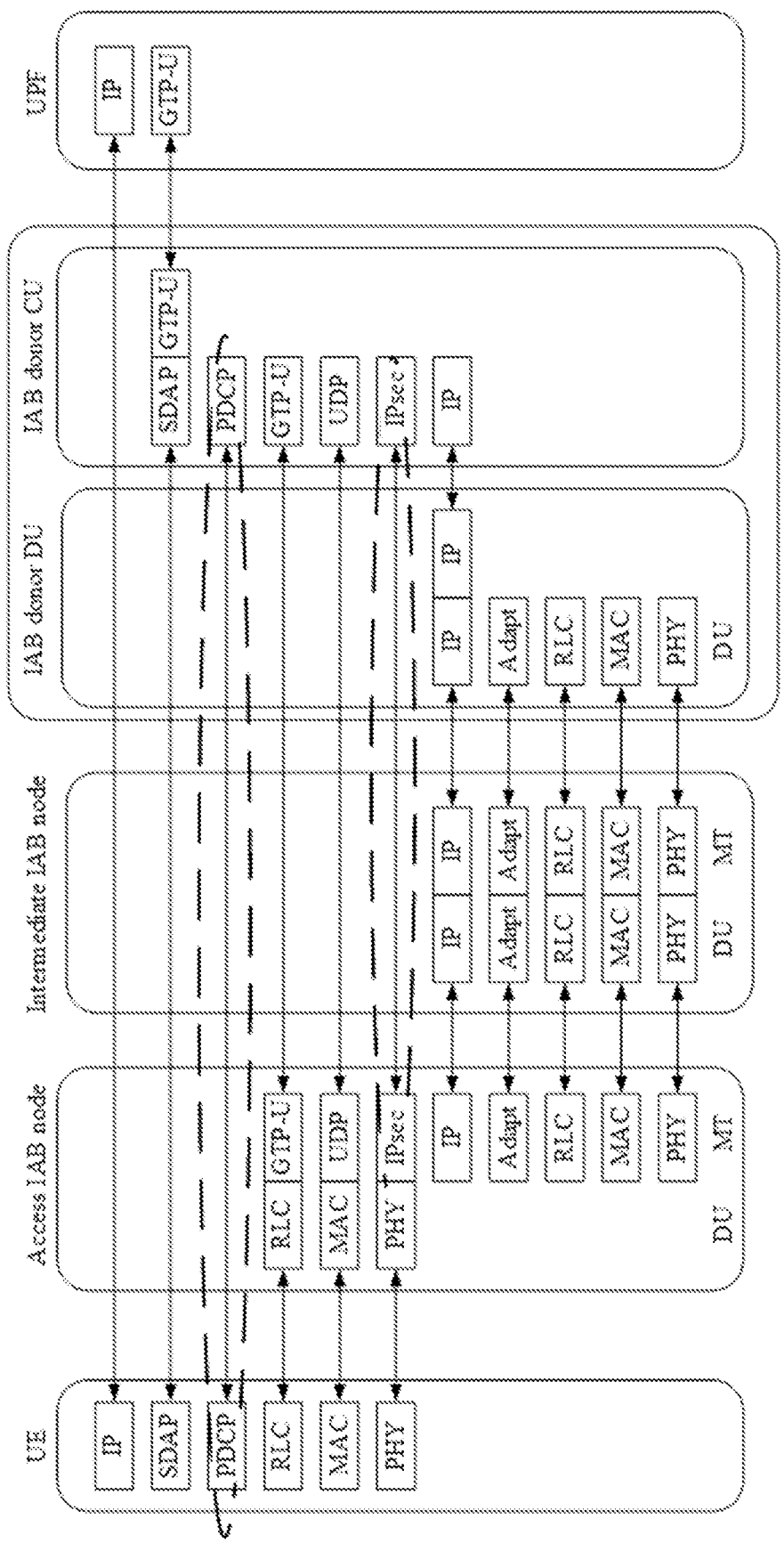
FIG. 11 is a schematic diagram of protocol stacks of IAB-related nodes.

Descriptions are provided with reference to protocol stacks of IAB-related nodes shown in FIG. 11. In an IAB network, a process in which UE receives/sends data on a user plane relates to the following nodes: the UE, an access IAB node, an intermediate IAB node, an IAB donor, and a UPF.

The access IAB node is an IAB node configured to provide an access service for a terminal. The intermediate IAB node is an IAB node that provides a wireless backhaul function. The intermediate IAB node is optional.

As shown in FIG. 11, a protocol stack of the UE may include an IP layer, a service discovery application profile (SDAP) layer, a PDCP layer, a radio link control (RLC) layer, a media access control (MAC) layer, and a physical layer (PHY layer).

A protocol stack of a DU of the access IAB node may include an RLC layer, a MAC layer, and a PHY layer. A protocol stack of an MT of the access IAB node may include a general packet radio service tunneling protocol (GTP)-user (U) layer, a UDP layer, an IPsec layer, an IP layer, an adaptation (Adapt) layer, an RLC layer, a MAC layer, and a PHY layer.

A protocol stack of a DU of the intermediate IAB node includes an IP layer, an Adapt layer, an RLC layer, a MAC layer, and a PHY layer. A protocol stack of an MT of the intermediate IAB node includes an IP layer, an Adapt layer, an RLC layer, a MAC layer, and a PHY layer.

A protocol stack of an IAB donor DU may include an IP layer, an Adapt layer, an RLC layer, a MAC layer, and a PHY layer. A protocol stack of an IAB donor CU may include an SDAP layer, a PDCP layer, a GTP-U layer, a UDP layer, an IPsec layer, and an IP layer.

A protocol stack of the UPF may include an IP layer and a GTP-U layer.

For functions of the foregoing layers, for example, a function of the IP layer and a function of the RLC layer, refer to descriptions in the current technology. Details are not described herein.

It may be understood that the IAB node and the IAB donor establish an IPsec tunnel at the IPsec layer, to transmit a data packet.

To resolve the foregoing technical problem, an embodiment of this application provides a communications method. A technical principle of the communications method is as follows: A plurality of secure tunnels with different security statuses may be established between an IAB node and an IAB donor in advance. In this way, when a data packet is transmitted between the IAB node and the IAB donor, the IAB node/IAB donor may determine a target secure tunnel from the plurality of secure tunnels based on a PDCP layer security status of the data packet, where the target secure tunnel is used to transmit the data packet.

Optionally, a security status of the target secure tunnel should be complementary to the PDCP layer security status of the data packet. Alternatively, a security status of the target secure tunnel is the same as the PDCP layer security status of the data packet. The embodiments of this application are not limited thereto.

The following describes the technical solutions provided in the embodiments of this application with reference to specific embodiments.

Figure 12:
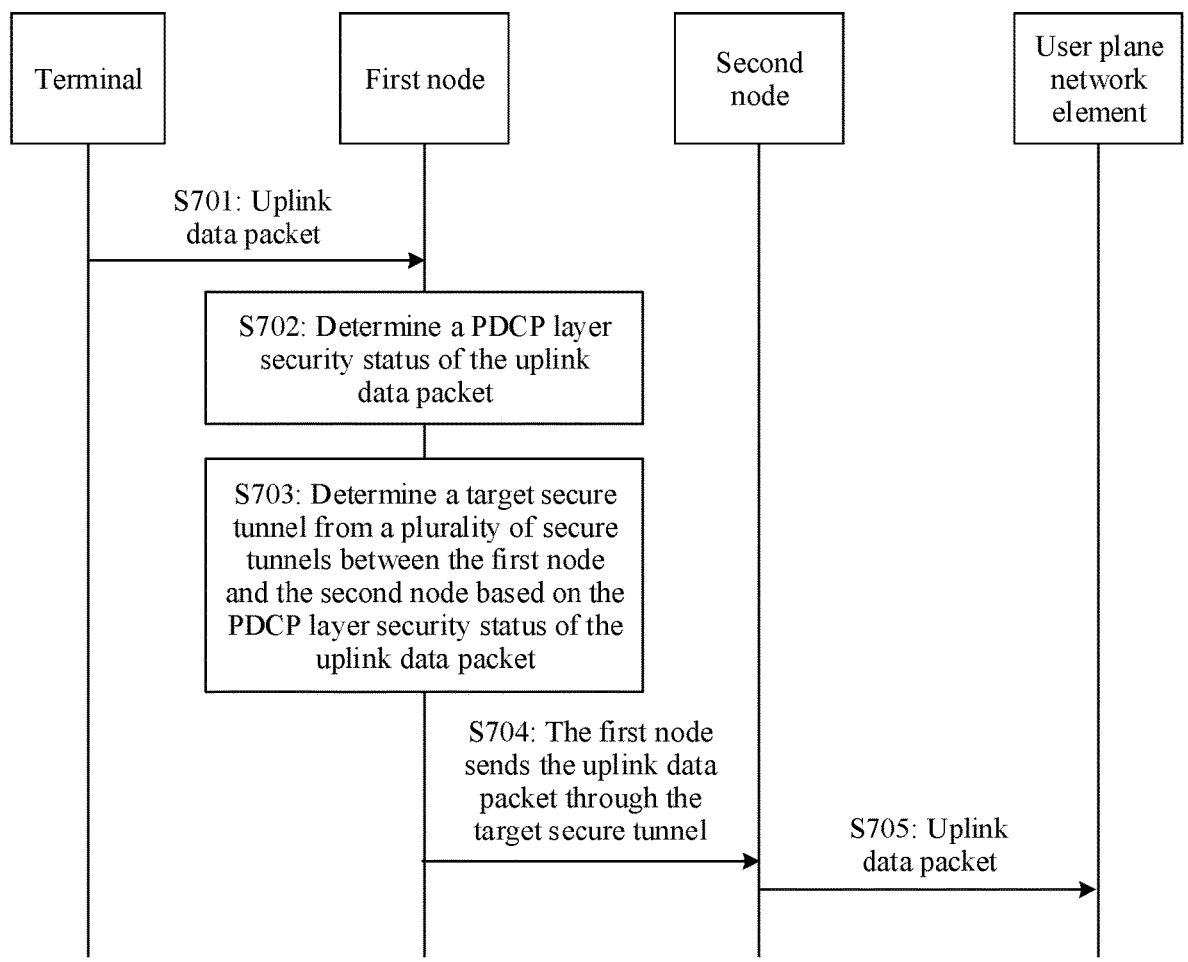
FIG. 12 is a flowchart of another communications method according to an embodiment of this application.

FIG. 12 shows a communications method according to an embodiment of this application. The communications method includes the following steps.

S701: A first node receives an uplink data packet from a terminal.

The first node is a node configured to support the terminal in accessing a network. For example, the first node may be an IAB node. The embodiments of this application are not limited thereto.

Optionally, the uplink data packet is an uplink PDCP data packet.

S702: The first node determines a PDCP layer security status of the uplink data packet.

In the embodiments of this application, a security status may be considered from a perspective of integrity protection. Alternatively, a security status may be considered from a perspective of encryption protection. Alternatively, a security status may be considered from a perspective of integrity protection and encryption protection.

Optionally, step S702 may be performed in any one of the following implementations.

Implementation 1: The first node determines the PDCP layer security status of the uplink data packet based on whether the uplink data packet carries a MAC-I.

It should be noted that Implementation 1 of step S702 is applicable to a case in which only integrity protection is considered for a security status.

Based on Implementation 1, the PDCP layer security status of the uplink data packet includes the following case: (1) integrity protection disabled; or (2) integrity protection enabled.

It should be noted that if the uplink data packet does not carry the MAC-I, the first node may determine that the PDCP layer security status of the uplink data packet is integrity protection disabled. If the uplink data packet carries the MAC-I, the first node may determine that the PDCP layer security status of the uplink data packet is integrity protection enabled.

Implementation 2: The first node determines the PDCP layer security status of the uplink data packet based on a pre-stored first correspondence and an identifier of a first transmission tunnel used to transmit the uplink data packet.

The first correspondence is a correspondence between an identifier of a first transmission tunnel and a PDCP layer security status. It should be noted that the first correspondence may be obtained by the first node from a second node.

It should be noted that the first transmission tunnel is a transmission tunnel between the first node and the second node. For example, the first node is an IAB node, and the second node is an IAB donor. The first transmission tunnel is an F1 tunnel between the IAB node and a CU of the IAB donor.

It may be understood that, for the first node and the second node, a secure tunnel is considered from a perspective of a protocol layer, and the first transmission tunnel is considered from a perspective of an interface. One secure tunnel may include a plurality of first transmission tunnels. To be specific, when a data packet is transmitted through a first transmission tunnel, a security policy of a secure tunnel corresponding to the first transmission tunnel is used for the data packet at a corresponding protocol layer.

For example, the first transmission tunnel is an F1 tunnel, and the secure tunnel is an IPsec tunnel. When a data packet is transmitted through the first transmission tunnel, a security policy of the IPsec tunnel corresponding to the first transmission tunnel is used for the data packet at an IPsec layer.

In the embodiments of this application, the first node may determine, based on a 5-tuple of the uplink data packet, the identifier of the first transmission tunnel used to transmit the uplink data packet. The 5-tuple includes a source IP address, a source port, a destination IP address, a destination port, and a transport layer protocol.

It should be noted that Implementation 2 of step S702 is applicable to a case in which only integrity protection is considered for a security status. Alternatively, Implementation 2 is applicable to a case in which only encryption protection is considered for a security status. Alternatively, Implementation 2 is applicable to a case in which integrity protection and encryption protection are considered for a security status.

Based on Implementation 2, in the case in which only integrity protection is considered for a security status, the PDCP layer security status of the uplink data packet includes the following case: (1) integrity protection enabled; or (2) integrity protection disabled.

Based on Implementation 2, in the case in which only encryption protection is considered for a security status, the PDCP layer security status of the uplink data packet includes the following case: (1) encryption protection enabled; or (2) encryption protection disabled.

Based on Implementation 2, in the case in which encryption protection and integrity protection are considered for a security status, the PDCP layer security status of the uplink data packet includes the following case: (1) both integrity protection and encryption protection enabled; (2) both integrity protection and encryption protection disabled; (3) integrity protection enabled and encryption protection disabled; or (4) integrity protection disabled and encryption protection enabled.

For example, if encryption protection and integrity protection are considered for a security status, for the first correspondence, refer to Table 1. Example descriptions are provided with reference to Table 1. If the first node transmits the uplink data packet through a first transmission tunnel #1, the first node may determine that the PDCP layer security status of the uplink data packet is both integrity protection and encryption protection enabled.

TABLE 1

| Identifier of a first transmission tunnel | PDCP layer security status |
|---|---|
| First transmission tunnel #1 | Both integrity protection and encryption protection enabled |
| First transmission tunnel #2 | Both integrity protection and encryption protection disabled |
| First transmission tunnel #3 | Integrity protection enabled and encryption protection disabled |
| First transmission tunnel #4 | Integrity protection disabled and encryption protection enabled |
| . . . | . . . |

It should be noted that, when the first node performs step S702, whether the first node uses Implementation 1 or Implementation 2 may be defined in a protocol, or configured by a core network/the second node.

Optionally, when the first node stores the first correspondence, the first node performs step S702 in Implementation 2. When the first node does not store the first correspondence, the first node performs step S702 in Implementation 1.

Certainly, when the first node stores the first correspondence, if the core network or the second node configures the first node to use Implementation 1, the first node performs step S702 in Implementation 1.

S703: The first node determines a target secure tunnel from a plurality of secure tunnels between the first node and the second node based on the PDCP layer security status of the uplink data packet.

The plurality of secure tunnels correspond to different security statuses.

In the case in which only integrity protection is considered for a security status, two secure tunnels may be established between the first node and the second node. A security status of a first secure tunnel is integrity protection disabled. A security status of a second secure tunnel is integrity protection enabled. It may be understood that encryption protection may or may not be enabled for the two secure tunnels. The embodiments of this application are not limited thereto.

In the case in which only encryption protection is considered for a security status, two secure tunnels may be established between the first node and the second node. A security status of a first secure tunnel is encryption protection disabled. A security status of a second secure tunnel is encryption protection enabled. It may be understood that integrity protection may or may not be enabled for the two secure tunnels. The embodiments of this application are not limited thereto.

In the case in which encryption protection and integrity protection are considered for a security status, four secure tunnels may be established between the first node and the second node. A security status of a first secure tunnel is both integrity protection and encryption protection enabled. A security status of a second secure tunnel is both integrity protection and encryption protection disabled. A security status of a third secure tunnel is integrity protection enabled and encryption protection disabled. A security status of a fourth secure tunnel is integrity protection disabled and encryption protection enabled.

In a possible implementation, the first node selects a secure tunnel whose security status is complementary to the PDCP layer security status of the uplink data packet from the plurality of secure tunnels as the target secure tunnel based on the PDCP layer security status of the uplink data packet and the security statuses of the plurality of secure tunnels. In other words, the security status of the target secure tunnel is complementary to the PDCP layer security status of the uplink data packet.

From different perspectives for security status consideration, the following describes a complementary relationship between the security status of the target secure tunnel and the PDCP layer security status of the uplink data packet.

1. On the premise that a security status is considered from a perspective of integrity protection, the security status of the target secure tunnel should be complementary to the PDCP layer security status of the uplink data packet, so that the uplink data packet receives integrity protection only once. Therefore, that the security status of the target secure tunnel should be complementary to the PDCP layer security status of the uplink data packet may include one of the following cases.

Case 1: If the PDCP layer security status of the uplink data packet is integrity protection enabled, the security status of the target secure tunnel is integrity protection disabled.

It may be understood that when the PDCP layer security status of the uplink data packet is integrity protection enabled, it indicates that the uplink data packet is integrity-protected at a PDCP layer. When the uplink data packet is integrity-protected at the PDCP layer, the first node may not perform integrity protection on the uplink data packet, to reduce a latency of processing the uplink data packet by the first node, so as to reduce a latency of transmitting the uplink data packet between the first node and the second node.

Case 2: If the PDCP layer security status of the uplink data packet is integrity protection disabled, the security status of the target secure tunnel is integrity protection enabled.

It may be understood that when the PDCP layer security status of the uplink data packet is integrity protection disabled, it indicates that the uplink data packet is not integrity-protected at a PDCP layer. When the uplink data packet is not integrity-protected at the PDCP layer, the first node needs to perform integrity protection on the uplink data packet, to prevent the uplink data packet from being tampered with by an attacker, and ensure integrity of the uplink data packet in a transmission process.

2. On the premise that a security status is considered from a perspective of encryption protection, the security status of the target secure tunnel should be complementary to the PDCP layer security status of the uplink data packet, so that the uplink data packet receives encryption protection only once. Therefore, that the security status of the target secure tunnel should be complementary to the PDCP layer security status of the uplink data packet may include one of the following cases.

Case 1: If the PDCP layer security status of the uplink data packet is encryption protection enabled, the security status of the target secure tunnel is encryption protection disabled.

It may be understood that when the PDCP layer security status of the uplink data packet is encryption protection enabled, it indicates that the uplink data packet is encrypted at a PDCP layer. When the uplink data packet is encryption-protected at the PDCP layer, the first node may not perform encryption protection on the uplink data packet, to reduce a latency of processing the uplink data packet by the first node, so as to reduce a latency of transmitting the uplink data packet between the first node and the second node.

Case 2: If the PDCP layer security status of the uplink data packet is encryption protection disabled, the security status of the target secure tunnel is encryption protection enabled.

It may be understood that when the PDCP layer security status of the uplink data packet is encryption protection disabled, it indicates that the uplink data packet is not encryption-protected at a PDCP layer. When the uplink data packet is not encryption-protected at the PDCP layer, the first node needs to perform encryption protection on the uplink data packet, to ensure confidentiality of the uplink data packet in a transmission process.

3. On the premise that a security status is considered from a perspective of encryption protection and integrity protection, the security status of the target secure tunnel should be complementary to the PDCP layer security status of the uplink data packet, so that the uplink data packet receives encryption protection and integrity protection only once. Therefore, that the security status of the target secure tunnel should be complementary to the PDCP layer security status of the data packet may include one of the following cases.

Case 1: If the PDCP layer security status of the uplink data packet is both integrity protection and encryption protection disabled, the security status of the target secure tunnel is both integrity protection and encryption protection enabled.

It may be understood that when the PDCP layer security status of the uplink data packet is both integrity protection and encryption protection disabled, it indicates that the uplink data packet is not integrity-protected or encryption-protected at a PDCP layer. When the uplink data packet is not encryption-protected or integrity-protected at the PDCP layer, the first node performs encryption protection and integrity protection on the uplink data packet, to ensure confidentiality and integrity of the uplink data packet in a transmission process.

Case 2: If the PDCP layer security status of the uplink data packet is both integrity protection and encryption protection enabled, the security status of the target secure tunnel is both integrity protection and encryption protection disabled.

It may be understood that when the PDCP layer security status of the uplink data packet is both integrity protection and encryption protection enabled, it indicates that the uplink data packet is integrity-protected and encryption-protected at a PDCP layer. When the uplink data packet is integrity-protected and encryption-protected at the PDCP layer, the first node does not perform encryption protection or integrity protection on the uplink data packet. This helps reduce a latency of processing the uplink data packet by the first node, so as to reduce a latency of transmitting the uplink data packet between the first node and the second node.

Case 3: If the PDCP layer security status of the uplink data packet is integrity protection enabled and encryption protection disabled, the security status of the target secure tunnel is integrity protection disabled and encryption protection enabled.

It may be understood that when the PDCP layer security status of the uplink data packet is integrity protection enabled, it indicates that the uplink data packet is integrity-protected at a PDCP layer. When the uplink data packet is integrity-protected at the PDCP layer, the first node may not perform integrity protection on the uplink data packet, to reduce a latency of processing the uplink data packet by the first node, so as to reduce a latency of transmitting the uplink data packet between the first node and the second node. In addition, when the PDCP layer security status of the uplink data packet is encryption protection disabled, it indicates that the uplink data packet is not encryption-protected at the PDCP layer. When the uplink data packet is not encryption-protected at the PDCP layer, the first node needs to perform encryption protection on the uplink data packet, to ensure confidentiality of the uplink data packet in a transmission process.

Case 4: If the PDCP layer security status of the uplink data packet is integrity protection disabled and encryption protection enabled, the security status of the target secure tunnel is integrity protection enabled and encryption protection disabled.

It may be understood that when the PDCP layer security status of the uplink data packet is encryption protection enabled, it indicates that the uplink data packet is encrypted at a PDCP layer. When the uplink data packet is encryption-protected at the PDCP layer, the first node may not perform encryption protection on the uplink data packet, to reduce a latency of processing the uplink data packet by the first node, so as to reduce a latency of transmitting the uplink data packet between the first node and the second node. In addition, when the PDCP layer security status of the uplink data packet is integrity protection disabled, it indicates that the uplink data packet is not integrity-protected at the PDCP layer. When the uplink data packet is not integrity-protected at the PDCP layer, the first node needs to perform integrity protection on the uplink data packet, to prevent the uplink data packet from being tampered with by an attacker, and ensure integrity of the uplink data packet in a transmission process.

In another possible implementation, the first node selects a secure tunnel whose security status is the same as the PDCP layer security status of the uplink data packet from the plurality of secure tunnels as the target secure tunnel based on the PDCP layer security status of the uplink data packet and the security statuses of the plurality of secure tunnels. In other words, the security status of the target secure tunnel is the same as the PDCP layer security status of the uplink data packet.

It may be understood that, because the PDCP layer security status of the uplink data packet is determined by a core network or a base station, the security status of the secure tunnel used to transmit the data packet is the same as the PDCP layer security status of the data packet, and no additional security risk is caused.

From different perspectives for security status consideration, the following describes how the security status of the target secure tunnel is the same as the PDCP layer security status of the uplink data packet.

1. On the premise that a security status is considered from a perspective of integrity protection, that the security status of the target secure tunnel is the same as the PDCP layer security status of the uplink data packet may include one of the following cases.

Case 1: If the PDCP layer security status of the uplink data packet is integrity protection disabled, the security status of the target secure tunnel is integrity protection disabled.

It may be understood that, when the security status of the target secure tunnel is integrity protection disabled, the first node does not need to perform integrity protection calculation on the uplink data packet, to reduce a latency of processing the data packet by the first node, so as to reduce a latency of transmitting the data packet between the first node and the second node.

Case 2: If the PDCP layer security status of the uplink data packet is integrity protection enabled, the security status of the target secure tunnel is integrity protection enabled.

2. On the premise that a security status is considered from a perspective of encryption protection, that the security status of the target secure tunnel is the same as the PDCP layer security status of the uplink data packet may include one of the following cases.

Case 1: If the PDCP layer security status of the uplink data packet is encryption protection enabled, the security status of the target secure tunnel is encryption protection enabled.

Case 2: If the PDCP layer security status of the uplink data packet is encryption protection disabled, the security status of the target secure tunnel is encryption protection disabled.

It may be understood that, when the security status of the target secure tunnel is encryption protection disabled, the first node does not need to perform encryption calculation on the uplink data packet, to reduce a latency of processing the data packet by the first node, so as to reduce a latency of transmitting the data packet between the first node and the second node.

3. On the premise that a security status is considered from a perspective of encryption protection and integrity protection, that the security status of the target secure tunnel is the same as the PDCP layer security status of the uplink data packet may include one of the following cases.

Case 1: If the PDCP layer security status of the uplink data packet is both integrity protection and encryption protection disabled, the security status of the target secure tunnel is both integrity protection and encryption protection disabled.

It may be understood that, when the security status of the target secure tunnel is both integrity protection and encryption protection disabled, the first node does not need to perform integrity protection calculation or encryption calculation on the uplink data packet, to reduce a latency of processing the data packet by the first node, so as to reduce a latency of transmitting the data packet between the first node and the second node.

Case 2: If the PDCP layer security status of the uplink data packet is both integrity protection and encryption protection enabled, the security status of the target secure tunnel is both integrity protection and encryption protection enabled.

Case 3: If the PDCP layer security status of the uplink data packet is integrity protection enabled and encryption protection disabled, the security status of the target secure tunnel is integrity protection enabled and encryption protection disabled.

It may be understood that, when the security status of the target secure tunnel is encryption protection disabled, the first node does not need to perform encryption calculation on the uplink data packet, to reduce a latency of processing the data packet by the first node, so as to reduce a latency of transmitting the data packet between the first node and the second node.

Case 4: If the PDCP layer security status of the uplink data packet is integrity protection disabled and encryption protection enabled, the security status of the target secure tunnel is integrity protection disabled and encryption protection enabled.

It may be understood that, when the security status of the target secure tunnel is integrity protection disabled, the first node does not need to perform integrity protection calculation on the uplink data packet, to reduce a latency of processing the data packet by the first node, so as to reduce a latency of transmitting the data packet between the first node and the second node.

In another possible implementation, the first node uses a secure tunnel whose security status is integrity protection disabled and/or encryption protection disabled as the target secure tunnel. In other words, the security status of the target secure tunnel is integrity protection disabled and/or encryption protection disabled.

It may be understood that, because the security status of the target secure tunnel is integrity protection disabled and/or encryption protection disabled, the first node does not need to perform encryption calculation and/or integrity protection calculation on the data packet, to reduce a latency of processing the data packet by the first node, so as to reduce a latency of transmitting the data packet between the first node and the second node.

S704: The first node sends the uplink data packet to the second node through the target secure tunnel, so that the second node receives the uplink data packet from the first node through the target secure tunnel.

S705: The second node sends the uplink data packet to a user plane network element, so that the user plane network element receives the uplink data packet from the second node.

It should be noted that, in a 5G network, the user plane network element is a UPF. Unified descriptions are provided herein, and are not described below again.

Compared with that in the current technology in which the first node needs to perform encryption calculation and integrity protection calculation on an uplink data packet before transmitting the uplink data packet through a secure tunnel, according to the technical solutions shown in FIG. 12, because the security status of the target secure tunnel is complementary to the PDCP layer security status of the uplink data packet or the security status of the target secure tunnel is the same as the PDCP layer security status of the uplink data packet, in some cases, the first node transmits the uplink data packet through the target secure tunnel, and may not perform encryption calculation and/or integrity protection calculation on the uplink data packet. This reduces a latency of processing the uplink data packet by the first node. Correspondingly, the second node does not need to perform decryption calculation and/or integrity check calculation on the data packet. This reduces a latency of processing the uplink data packet by the second node. In other words, according to the technical solutions provided in this application, the latencies of processing the data packet by the first node and the second node are reduced, to reduce a latency of transmitting the data packet between the first node and the second node.

Figure 13:
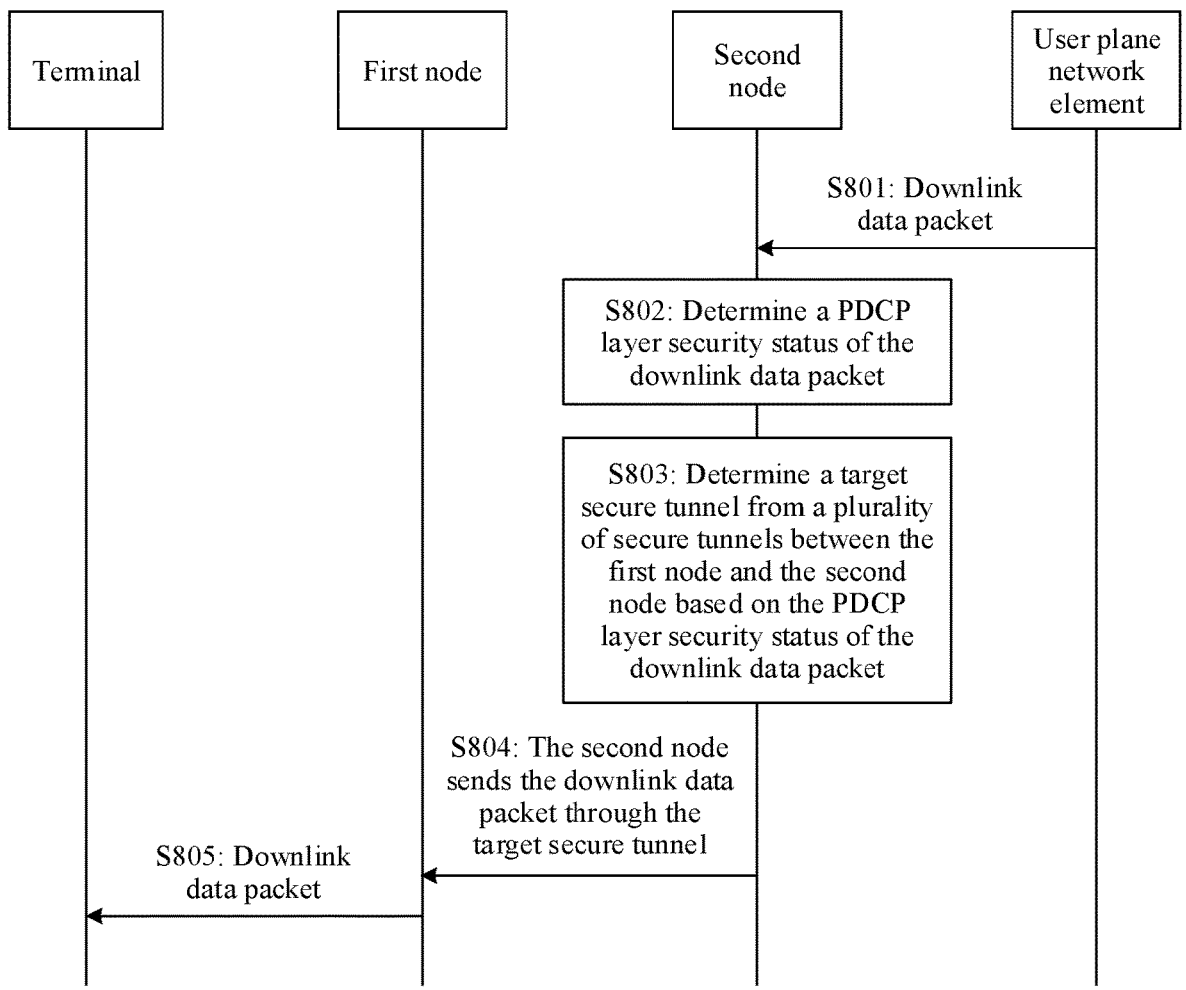
FIG. 13 is a flowchart of another communications method according to an embodiment of this application.

FIG. 13 shows a communications method according to an embodiment of this application. The communications method includes the following steps.

S801: A second node receives a downlink data packet from a user plane network element.

Optionally, the downlink data packet is a downlink PDCP data packet.

It may be understood that the user plane network element transmits the downlink data packet through a second transmission tunnel. Therefore, the second node may determine an identifier of the second transmission tunnel used to transmit the downlink data packet.

It should be noted that the second transmission tunnel is a transmission tunnel between the second node and the user plane network element. For example, the second node is an IAB donor, and the user plane network element is a UPF. The second transmission tunnel is an N3 tunnel between a CU of the IAB donor and the UPF.

S802: The second node determines a PDCP layer security status of the downlink data packet.

In the embodiments of this application, a security status may be considered from a perspective of integrity protection. Alternatively, a security status may be considered from a perspective of encryption protection. Alternatively, a security status may be considered from a perspective of integrity protection and encryption protection.

Optionally, step S802 may include the following implementations.

Implementation 1: The second node determines the PDCP layer security status of the downlink data packet based on whether the downlink data packet carries a MAC-I.

It should be noted that Implementation 1 of step S802 is applicable to a case in which only integrity protection is considered for a security status.

Based on Implementation 1, the PDCP layer security status of the downlink data packet includes the following case: (1) integrity protection disabled; or (2) integrity protection enabled.

It should be noted that if the downlink data packet does not carry the MAC-I, the second node may determine that the PDCP layer security status of the downlink data packet is integrity protection disabled. If the downlink data packet carries the MAC-I, the second node may determine that the PDCP layer security status of the downlink data packet is integrity protection enabled.

Implementation 2: The second node determines the PDCP layer security status of the downlink data packet based on a pre-stored second correspondence and the identifier of the second transmission tunnel used to transmit the downlink data packet.

The second correspondence is a correspondence between an identifier of a second transmission tunnel and a PDCP layer security status. It should be noted that the second correspondence may be generated by the second node.

It should be noted that Implementation 2 of step S802 is applicable to a case in which only integrity protection is considered for a security status. Alternatively, Implementation 2 is applicable to a case in which only encryption protection is considered for a security status. Alternatively, Implementation 2 is applicable to a case in which integrity protection and encryption protection are considered for a security status.

Based on Implementation 2, in the case in which only integrity protection is considered for a security status, the PDCP layer security status of the downlink data packet includes the following case: (1) integrity protection enabled; or (2) integrity protection disabled.

Based on Implementation 2, in the case in which only encryption protection is considered for a security status, the PDCP layer security status of the downlink data packet includes the following case: (1) encryption protection enabled; or (2) encryption protection disabled.

Based on Implementation 2, in the case in which encryption protection and integrity protection are considered for a security status, the PDCP layer security status of the downlink data packet includes the following case: (1) both integrity protection and encryption protection enabled; (2) both integrity protection and encryption protection disabled; (3) integrity protection enabled and encryption protection disabled; or (4) integrity protection disabled and encryption protection enabled.

For example, if integrity protection and encryption protection are considered for a security status, for the second correspondence, refer to Table 2. Example descriptions are provided with reference to Table 2. If the second node receives the downlink data packet through a second transmission tunnel #1, the second node may determine that the PDCP layer security status of the downlink data packet is both integrity protection and encryption protection enabled.

TABLE 2

| Identifier of a second transmission tunnel | PDCP layer security status |
| --- | --- |
| Second transmission tunnel #1 | Both integrity protection and encryption protection enabled |
| Second transmission tunnel #2 | Both integrity protection and encryption protection disabled |
| Second transmission tunnel #3 | Integrity protection enabled and encryption protection disabled |
| Second transmission tunnel #4 | Integrity protection disabled and encryption protection enabled |
| . . . | . . . |

It should be noted that, when the second node performs step S802, whether the second node uses Implementation 1 or Implementation 2 may be defined in a protocol, or configured by a core network.

Optionally, when the second node stores the second correspondence, the second node performs step S802 in Implementation 2. When the second node does not store the second correspondence, the second node performs step S802 in Implementation 1.

Certainly, when the second node stores the second correspondence, if the core network configures the second node to use Implementation 1, the second node performs step S802 in Implementation 1.

S803: The second node determines a target secure tunnel from a plurality of secure tunnels between a first node and the second node based on the PDCP layer security status of the downlink data packet.

The plurality of secure tunnels correspond to different security statuses.

In the case in which only integrity protection is considered for a security status, two secure tunnels may be established between the first node and the second node. A security status of a first secure tunnel is integrity protection disabled. A security status of a second secure tunnel is integrity protection enabled. It may be understood that encryption protection may or may not be enabled for the two secure tunnels. The embodiments of this application are not limited thereto.

In the case in which only encryption protection is considered for a security status, two secure tunnels may be established between the first node and the second node. A security status of a first secure tunnel is encryption protection disabled. A security status of a second secure tunnel is encryption protection enabled. It may be understood that integrity protection may or may not be enabled for the two secure tunnels. The embodiments of this application are not limited thereto.

In the case in which encryption protection and integrity protection are considered for a security status, four secure tunnels may be established between the first node and the second node. A security status of a first secure tunnel is both integrity protection and encryption protection enabled. A security status of a second secure tunnel is both integrity protection and encryption protection disabled. A security status of a third secure tunnel is integrity protection enabled and encryption protection disabled. A security status of a fourth secure tunnel is integrity protection disabled and encryption protection enabled.

In a possible implementation, the second node selects a secure tunnel whose security status is complementary to the PDCP layer security status of the downlink data packet from the plurality of secure tunnels as the target secure tunnel based on the PDCP layer security status of the downlink data packet and the security statuses of the plurality of secure tunnels. In other words, the security status of the target secure tunnel is complementary to the PDCP layer security status of the downlink data packet.

From different perspectives for security status consideration, the following describes how the security status of the target secure tunnel is complementary to the PDCP layer security status of the downlink data packet.

1. On the premise that a security status is considered from a perspective of integrity protection, the security status of the target secure tunnel should be complementary to the PDCP layer security status of the downlink data packet, so that the downlink data packet receives integrity protection only once. Therefore, that the security status of the target secure tunnel should be complementary to the PDCP layer security status of the downlink data packet may include one of the following cases.

Case 1: If the PDCP layer security status of the downlink data packet is integrity protection enabled, the security status of the target secure tunnel is integrity protection disabled.

It may be understood that when the PDCP layer security status of the downlink data packet is integrity protection enabled, it indicates that the downlink data packet is integrity-protected at a PDCP layer. When the downlink data packet is integrity-protected at the PDCP layer, the second node may not perform integrity protection on the downlink data packet, to reduce a latency of processing the downlink data packet by the second node, so as to reduce a latency of transmitting the downlink data packet between the second node and the first node.

Case 2: If the PDCP layer security status of the downlink data packet is integrity protection disabled, the security status of the target secure tunnel is integrity protection enabled.

It may be understood that when the PDCP layer security status of the downlink data packet is integrity protection disabled, it indicates that the downlink data packet is not integrity-protected at a PDCP layer. When the downlink data packet is not integrity-protected at the PDCP layer, the second node needs to perform integrity protection on the downlink data packet, to prevent the downlink data packet from being tampered with by an attacker, and ensure integrity of the downlink data packet in a transmission process.

2. On the premise that a security status is considered from a perspective of encryption protection, the security status of the target secure tunnel should be complementary to the PDCP layer security status of the downlink data packet, so that the downlink data packet receives encryption protection only once. Therefore, that the security status of the target secure tunnel should be complementary to the PDCP layer security status of the downlink data packet may include one of the following cases.

Case 1: If the PDCP layer security status of the downlink data packet is encryption protection enabled, the security status of the target secure tunnel is encryption protection disabled.

It may be understood that when the PDCP layer security status of the downlink data packet is encryption protection enabled, it indicates that the downlink data packet is encrypted at a PDCP layer. When the downlink data packet is encryption-protected at the PDCP layer, the second node may not perform encryption protection on the downlink data packet, to reduce a latency of processing the downlink data packet by the second node, so as to reduce a latency of transmitting the downlink data packet between the second node and the first node.

Case 2: If the PDCP layer security status of the downlink data packet is encryption protection disabled, the security status of the target secure tunnel is encryption protection enabled.

It may be understood that when the PDCP layer security status of the downlink data packet is encryption protection disabled, it indicates that the downlink data packet is not encryption-protected at a PDCP layer. When the downlink data packet is not encryption-protected at the PDCP layer, the second node needs to perform encryption protection on the downlink data packet, to ensure confidentiality of the downlink data packet in a transmission process.

3. On the premise that a security status is considered from a perspective of encryption protection and integrity protection, the security status of the target secure tunnel should be complementary to the PDCP layer security status of the downlink data packet, so that the downlink data packet receives encryption protection and integrity protection only once. Therefore, that the security status of the target secure tunnel should be complementary to the PDCP layer security status of the data packet may include one of the following cases.

Case 1: If the PDCP layer security status of the downlink data packet is both integrity protection and encryption protection disabled, the security status of the target secure tunnel is both integrity protection and encryption protection enabled.

It may be understood that when the PDCP layer security status of the downlink data packet is both integrity protection and encryption protection disabled, it indicates that the downlink data packet is not integrity-protected or encryption-protected at a PDCP layer. When the downlink data packet is not encryption-protected or integrity-protected at the PDCP layer, the second node does not perform encryption protection and integrity protection on the downlink data packet, to ensure confidentiality and integrity of the downlink data packet in a transmission process.

Case 2: If the PDCP layer security status of the downlink data packet is both integrity protection and encryption protection enabled, the security status of the target secure tunnel is both integrity protection and encryption protection disabled.

It may be understood that when the PDCP layer security status of the downlink data packet is both integrity protection and encryption protection enabled, it indicates that the downlink data packet is integrity-protected and encryption-protected at a PDCP layer. When the downlink data packet is integrity-protected and encryption-protected at the PDCP layer, the second node does not perform encryption protection or integrity protection on the downlink data packet. This helps reduce a latency of processing the downlink data packet by the second node, so as to reduce a latency of transmitting the downlink data packet between the second node and the first node.

Case 3: If the PDCP layer security status of the downlink data packet is integrity protection enabled and encryption protection disabled, the security status of the target secure tunnel is integrity protection disabled and encryption protection enabled.

When the PDCP layer security status of the downlink data packet is integrity protection enabled, it indicates that the downlink data packet is integrity-protected at a PDCP layer. When the downlink data packet is integrity-protected at the PDCP layer, the second node may perform integrity protection on the downlink data packet, to reduce a latency of processing the downlink data packet by the second node, so as to reduce a latency of transmitting the downlink data packet between the second node and the first node.

In addition, when the PDCP layer security status of the downlink data packet is encryption protection disabled, it indicates that the downlink data packet is not encryption-protected at the PDCP layer. When the downlink data packet is not encryption-protected at the PDCP layer, the second node needs to perform encryption protection on the downlink data packet, to ensure confidentiality of the downlink data packet in a transmission process.

Case 4: If the PDCP layer security status of the downlink data packet is integrity protection disabled and encryption protection enabled, the security status of the target secure tunnel is integrity protection enabled and encryption protection disabled.

When the PDCP layer security status of the downlink data packet is encryption protection enabled, it indicates that the downlink data packet is encrypted at a PDCP layer. When the downlink data packet is encryption-protected at the PDCP layer, the second node may not perform encryption protection on the downlink data packet, to reduce a latency of processing the downlink data packet by the second node, so as to reduce a latency of transmitting the downlink data packet between the second node and the first node.

In addition, when the PDCP layer security status of the downlink data packet is integrity protection disabled, it indicates that the downlink data packet is not integrity-protected at the PDCP layer. When the downlink data packet is not integrity-protected at the PDCP layer, the second node needs to perform integrity protection on the downlink data packet, to prevent the downlink data packet from being tampered with by an attacker, and ensure integrity of the downlink data packet in a transmission process.

In another possible implementation, the second node selects a secure tunnel whose security status is the same as the PDCP layer security status of the downlink data packet from the plurality of secure tunnels as the target secure tunnel based on the PDCP layer security status of the downlink data packet and the security statuses of the plurality of secure tunnels. In other words, the security status of the target secure tunnel is the same as the PDCP layer security status of the downlink data packet.

It may be understood that, because the PDCP layer security status of the downlink data packet is determined by a core network or a base station, the security status of the secure tunnel used to transmit the data packet is the same as the PDCP layer security status of the data packet, and no additional security risk is caused.

From different perspectives for security status consideration, the following describes how the security status of the target secure tunnel is the same as the PDCP layer security status of the downlink data packet.

1. On the premise that a security status is considered from a perspective of integrity protection, that the security status of the target secure tunnel is the same as the PDCP layer security status of the downlink data packet may include one of the following cases.

Case 1: If the PDCP layer security status of the downlink data packet is integrity protection disabled, the security status of the target secure tunnel is integrity protection disabled.

It may be understood that, when the security status of the target secure tunnel is integrity protection disabled, the second node does not need to perform integrity protection calculation on the downlink data packet, to reduce a latency of processing the data packet by the second node, so as to reduce a latency of transmitting the data packet between the second node and the first node.

Case 2: If the PDCP layer security status of the downlink data packet is integrity protection enabled, the security status of the target secure tunnel is integrity protection enabled.

2. On the premise that a security status is considered from a perspective of encryption protection, that the security status of the target secure tunnel is the same as the PDCP layer security status of the downlink data packet may include one of the following cases.

Case 1: If the PDCP layer security status of the downlink data packet is encryption protection enabled, the security status of the target secure tunnel is encryption protection enabled.

Case 2: If the PDCP layer security status of the downlink data packet is encryption protection disabled, the security status of the target secure tunnel is encryption protection disabled.

It may be understood that, when the security status of the target secure tunnel is encryption protection disabled, the second node does not need to perform encryption calculation on the downlink data packet, to reduce a latency of processing the data packet by the second node, so as to reduce a latency of transmitting the data packet between the second node and the first node.

3. On the premise that a security status is considered from a perspective of encryption protection and integrity protection, that the security status of the target secure tunnel is the same as the PDCP layer security status of the downlink data packet may include one of the following cases.

Case 1: If the PDCP layer security status of the downlink data packet is both integrity protection and encryption protection disabled, the security status of the target secure tunnel is both integrity protection and encryption protection disabled.

It may be understood that, when the security status of the target secure tunnel is both integrity protection and encryption protection disabled, the second node does not need to perform integrity protection calculation or encryption calculation on the downlink data packet, to reduce a latency of processing the data packet by the second node, so as to reduce a latency of transmitting the data packet between the second node and the first node.

Case 2: If the PDCP layer security status of the downlink data packet is both integrity protection and encryption protection enabled, the security status of the target secure tunnel is both integrity protection and encryption protection enabled.

Case 3: If the PDCP layer security status of the downlink data packet is integrity protection enabled and encryption protection disabled, the security status of the target secure tunnel is integrity protection enabled and encryption protection disabled.

It may be understood that, when the security status of the target secure tunnel is encryption protection disabled, the second node does not need to perform encryption calculation on the downlink data packet, to reduce a latency of processing the data packet by the second node, so as to reduce a latency of transmitting the data packet between the second node and the first node.

Case 4: If the PDCP layer security status of the downlink data packet is integrity protection disabled and encryption protection enabled, the security status of the target secure tunnel is integrity protection disabled and encryption protection enabled.

It may be understood that, when the security status of the target secure tunnel is integrity protection disabled, the second node does not need to perform integrity protection calculation on the downlink data packet, to reduce a latency of processing the data packet by the second node, so as to reduce a latency of transmitting the data packet between the second node and the first node.

In another possible implementation, the second node uses a secure tunnel whose security status is integrity protection disabled and/or encryption protection disabled as the target secure tunnel. In other words, the security status of the target secure tunnel is integrity protection disabled and/or encryption protection disabled.

It may be understood that, because the security status of the target secure tunnel is integrity protection disabled and/or encryption protection disabled, the second node does not need to perform encryption calculation and/or integrity protection calculation on the data packet, to reduce a latency of processing the data packet by the second node, so as to reduce a latency of transmitting the data packet between the second node and the first node.

S804: The second node sends the downlink data packet to the first node through the target secure tunnel, so that the first node receives the downlink data packet from the second node through the target secure tunnel.

S805: The first node sends the downlink data packet to a terminal, so that the terminal receives the downlink data packet.

Compared with that in the current technology in which the second node needs to perform encryption calculation and integrity protection calculation on a downlink data packet in addition to transmitting the downlink data packet through a secure tunnel, according to the technical solutions shown in FIG. 13, because the security status of the target secure tunnel is complementary to the PDCP layer security status of the downlink data packet or the security status of the target secure tunnel is the same as the PDCP layer security status of the downlink data packet, in some cases, the second node transmits the downlink data packet through the target secure tunnel, and may not perform encryption calculation and/or integrity protection calculation on the downlink data packet. This reduces a latency of processing the downlink data packet by the second node. Correspondingly, the first node does not need to perform decryption calculation and/or integrity check calculation on the data packet. This reduces a latency of processing the uplink data packet by the first node. In other words, according to the technical solutions provided in this application, the latencies of processing the data packet by the first node and the second node are reduced, to reduce a latency of transmitting the data packet between the first node and the second node.

It should be noted that, in FIG. 13, operations performed by the second node are specifically performed by a CU-UP of the second node. To be specific, the CU-UP of the second node receives the downlink data packet from the user plane network element; the CU-UP of the second node determines the PDCP layer security status of the downlink data packet; the CU-UP of the second node determines the target secure tunnel from the plurality of secure tunnels between the first node and the second node based on the PDCP layer security status of the downlink data packet; and then the CU-UP of the second node sends the downlink data packet to the first node through the target secure tunnel.

The following describes a specific implementation in which the second node establishes the first correspondence and a specific implementation in which the second node establishes the second correspondence.

It should be noted that after the first node is started, the terminal may access a network through the first node, and create a PDU session. After a PDU session establishment procedure ends, the second node may generate the first correspondence and the second correspondence based on related information of the PDU session.

Figure 14:
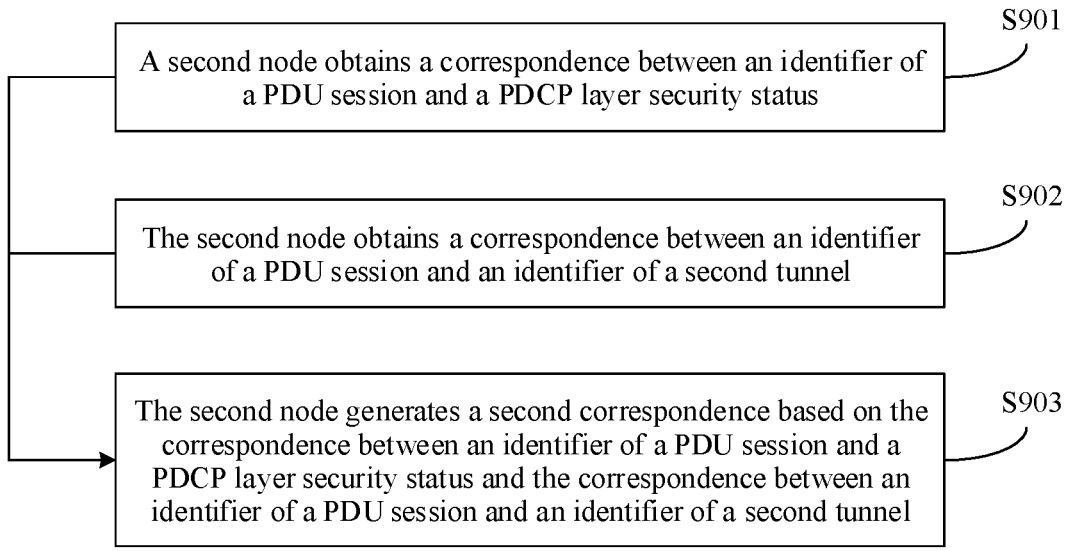
FIG. 14 is a flowchart of another communications method according to an embodiment of this application.

As shown in FIG. 14, that the second node generates the second correspondence includes the following steps.

S901: The second node obtains a correspondence between an identifier of a PDU session and a PDCP layer security status.

In an implementation, a CU-CP of the second node obtains the correspondence between an identifier of a PDU session and a PDCP layer security status.

For a PDU session, in a PDU session establishment procedure, the second node may receive an N2 SM message sent by an AMF. The N2 SM message includes an identifier of the PDU session, a core network address of a second transmission tunnel corresponding to the PDU session, a user plane security policy, and the like. According to the user plane security policy, the second node activates a user plane security status in an RRC connection reconfiguration procedure. The user plane security status may be understood as a PDCP layer security status.

Optionally, when the user plane security policy is a first policy, the user plane security status is both encryption protection and integrity protection enabled. When the user plane security policy is a second policy, the user plane security status is both encryption protection and integrity protection disabled. When the user plane security policy is a third policy, the user plane security status may be determined by the second node, or determined by the first node and the second node through negotiation.

The first policy may be named "required", the second policy may be named "no needed", and the third policy may be named "preferred". This is not limited in the embodiments of this application.

In this way, for a PDU session, the second node may obtain an identifier of the PDU session and a corresponding PDCP layer security status. Thus, the second node may establish the correspondence between an identifier of a PDU session and a PDCP layer security status.

In the embodiments of this application, a PDCP layer security status corresponding to a PDU session is equivalent to a user plane security status corresponding to the PDU session.

For example, if encryption protection and integrity protection are considered for a security status, for the correspondence between an identifier of a PDU session and a PDCP layer security status, refer to Table 3.

TABLE 3

| Identifier of a PDU session | PDCP layer security status |
| --- | --- |
| PDU session #1 | Both integrity protection and encryption protection enabled |
| PDU session #2 | Both integrity protection and encryption protection disabled |

TABLE 3-continued

| Identifier of a PDU session | PDCP layer security status |
| --- | --- |
| PDU session #3 | Integrity protection enabled and encryption protection disabled |
| PDU session #4 | Integrity protection disabled and encryption protection enabled |
| . . . | . . . |

S902: The second node obtains a correspondence between an identifier of a PDU session and an identifier of a second transmission tunnel.

In an implementation, the CU-CP of the second node obtains the correspondence between an identifier of a PDU session and an identifier of a second transmission tunnel.

For a PDU session, in a PDU session procedure, the second node allocates tunnel information on the second node to the PDU session. The tunnel information includes a tunnel endpoint address of the second node, and the like. The second node sends an N2 PDU session response to the AMF. The N2 PDU session response includes a PDU session identifier, an N2 SM message, and the like, and the N2 SM message includes the tunnel information on the second node. The second node may complete establishment of an uplink second transmission tunnel based on a core network address of the second transmission tunnel and the tunnel address of the second node. The AMF sends, to an SMF, an N2 SM message received from a RAN. The SMF initiates an N4 reply modification procedure, and sends the tunnel information on the second node to a UPF, to complete establishment of a downlink second transmission tunnel.

It may be understood that, for a PDU session, the second node participates in a process of establishing a second transmission tunnel. In the process of establishing the second transmission tunnel, the second node may obtain an identifier that is of the second transmission tunnel and that corresponds to an identifier of the PDU session. Therefore, the second node may establish the correspondence between an identifier of a PDU session and an identifier of a second transmission tunnel.

For example, for the correspondence between an identifier of a PDU session and an identifier of a second transmission tunnel, refer to Table 4.

TABLE 4

| Identifier of a PDU session | Identifier of a second transmission tunnel |
| --- | --- |
| PDU session #1 | Second transmission tunnel #5 |
| PDU session #2 | Second transmission tunnel #6 |
| PDU session #3 | Second transmission tunnel #7 |
| PDU session #4 | Second transmission tunnel #8 |
| . . . | . . . |

S903: The second node generates the second correspondence based on the correspondence between an identifier of a PDU session and a PDCP layer security status and the correspondence between an identifier of a PDU session and an identifier of a second transmission tunnel.

In an implementation, the CU-CP of the second node generates the second correspondence based on the correspondence between an identifier of a PDU session and a PDCP layer security status and the correspondence between an identifier of a PDU session and an identifier of a second transmission tunnel.

It may be understood that, for a PDU session, a PDCP layer security status corresponding to the PDU session is a PDCP layer security status corresponding to a second transmission tunnel in the PDU session.

Example descriptions are provided with reference to Table 3 and Table 4. The PDU session #1 is used as an example. A PDCP layer security status corresponding to the PDU session #1 is both integrity protection and encryption protection enabled, and the PDU session #1 corresponds to the second transmission tunnel #5. Therefore, a PDCP layer security status corresponding to the second transmission tunnel #5 is both integrity protection and encryption protection enabled. The PDU session #2 is used as an example. A PDCP layer security status corresponding to the PDU session #2 is both integrity protection and encryption protection disabled, and the PDU session #2 corresponds to the second transmission tunnel #6. Therefore, a PDCP layer security status corresponding to the second transmission tunnel #6 is both integrity protection and encryption protection disabled.

In the embodiments of this application, after the CU-CP of the second node generates the second correspondence, the CU-CP of the second node sends the second correspondence to the CU-UP of the second node. After the CU-UP of the second node receives the second correspondence, the CU-UP of the second node stores the second correspondence.

According to the technical solutions shown in FIG. 14, the second node may obtain the second correspondence, so that the second node may perform step S802 in FIG. 13 in Implementation 2.

Figure 15:
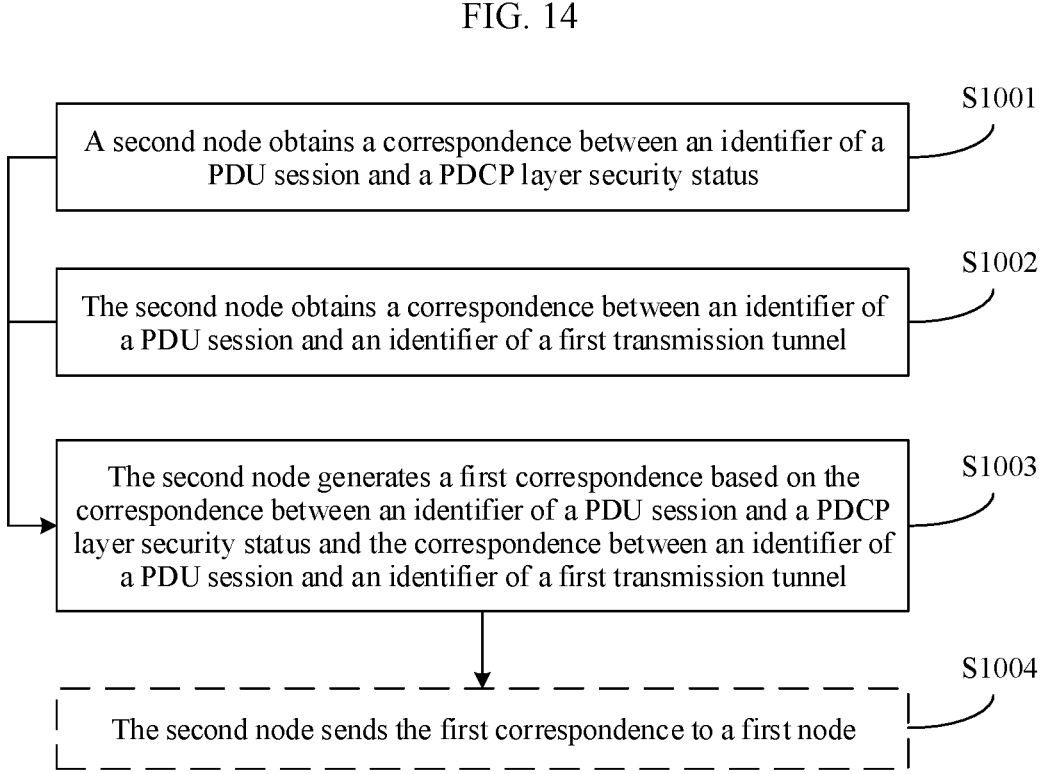
FIG. 15 is a flowchart of another communications method according to an embodiment of this application.

As shown in FIG. 15, that the second node generates the first correspondence includes the following steps.

S1001 is the same as step S901. For specific descriptions of S1001, refer to the embodiment shown in FIG. 14. Details are not described herein again.

S1002: The second node obtains a correspondence between an identifier of a PDU session and an identifier of a first transmission tunnel.

In an implementation, the CU-CP of the second node obtains the correspondence between an identifier of a PDU session and an identifier of a first transmission tunnel.

It may be understood that, to transmit user plane data, the second node establishes a DRB in a PDU session for the terminal. Therefore, for a PDU session, the second node may determine a DRB in the PDU session. Thus, the second node may establish a correspondence between an identifier of a PDU session and a DRB.

For example, for the correspondence between an identifier of a PDU session and a DRB, refer to Table 5.

TABLE 5

| Identifier of a PDU session | DRB |
| --- | --- |
| PDU session #1 | DRB #1 |
| PDU session #2 | DRB #2 |
| PDU session #3 | DRB #3 |
| PDU session #4 | DRB #4 |
| ... | ... |

It may be understood that a DRB includes two parts: a DU-to-terminal bearer and a CU-to-DU bearer, and the CU-to-DU bearer is referred to as a first transmission tunnel. Therefore, in a DRB establishment process, the second node may obtain an identifier of a first transmission tunnel. To be specific, the second node may establish a correspondence between a DRB and an identifier of a first transmission tunnel.

It should be noted that, because a plurality of first transmission tunnels may be configured in one DRB, a correspondence between a DRB and a first transmission tunnel is a one-to-many correspondence.

For example, for the correspondence between a DRB and an identifier of a first transmission tunnel, refer to Table 6.

TABLE 6

| DRB | Identifier of a first transmission tunnel |
| --- | --- |
| DRB #1 | First transmission tunnel #5 |
| DRB #1 | First transmission tunnel #6 |
| DRB #2 | First transmission tunnel #7 |
| DRB #3 | First transmission tunnel #8 |
| DRB #4 | First transmission tunnel #9 |
| ... | ... |

Therefore, based on the correspondence between an identifier of a PDU session and a DRB and the correspondence between a DRB and an identifier of a first transmission tunnel, the second node may determine the correspondence between an identifier of a PDU session and an identifier of a first transmission tunnel.

In other words, with reference to Table 5 and Table 6, Table 7 shows the correspondence between an identifier of a PDU session and an identifier of a first transmission tunnel.

TABLE 7

| Identifier of a PDU session | Identifier of a first transmission tunnel |
| --- | --- |
| PDU session #1 | First transmission tunnel #5 |
| PDU session #1 | First transmission tunnel #6 |
| PDU session #2 | First transmission tunnel #7 |
| PDU session #3 | First transmission tunnel #8 |
| PDU session #4 | First transmission tunnel #9 |
| ... | ... |

S1003: The second node generates the first correspondence based on the correspondence between an identifier of a PDU session and a PDCP layer security status and the correspondence between an identifier of a PDU session and an identifier of a first transmission tunnel.

In an implementation, the CU-CP of the second node determines the first correspondence based on the correspondence between an identifier of a PDU session and a PDCP layer security status, the correspondence between an identifier of a PDU session and a DRB, and the correspondence between a DRB and an identifier of a first transmission tunnel.

It may be understood that a PDCP layer security status corresponding to a PDU session is a PDCP layer security status corresponding to a DRB in the PDU session. The PDCP layer security status corresponding to the DRB is a PDCP layer security status corresponding to a first transmission tunnel configured in the DRB.

Example descriptions are provided with reference to Table 3 and Table 7. The PDU session #1 is used as an example. A PDCP layer security status corresponding to the PDU session #1 is both integrity protection and encryption protection enabled, and the PDU session #1 corresponds to the first transmission tunnel #5 and the first transmission tunnel #6. Therefore, a PDCP layer security status corresponding to the first transmission tunnel #5 is both integrity protection and encryption protection enabled, and a PDCP layer security status corresponding to the first transmission tunnel #6 is both integrity protection and encryption protection enabled.

Optionally, after the IAB donor generates the first correspondence, the IAB donor may send the first correspondence to the IAB node. As shown in FIG. 15, after step 1003, the communications method further includes step 1004.

S1004: The second node sends the first correspondence to the first node, so that the first node obtains the first correspondence.

In an implementation, the CU-CP of the second node sends the first correspondence to the first node.

It may be understood that, after obtaining the first correspondence, the first node stores the first correspondence.

According to the technical solutions shown in FIG. 15, the first node may obtain the first correspondence, so that the first node may perform step S702 in FIG. 12 in Implementation 2.

A procedure of establishing a secure tunnel between the first node and the second node is described below by using an example in which the secure tunnel is an IPsec tunnel.

Figure 16:
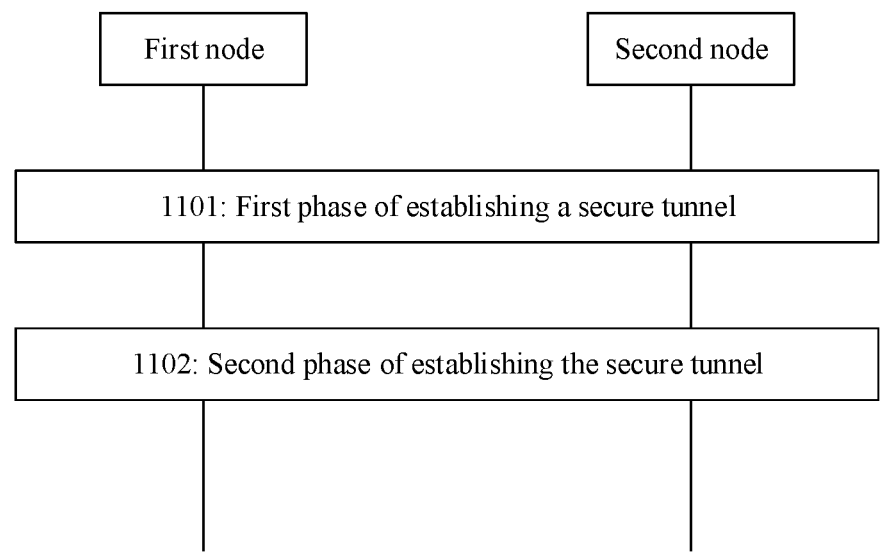
FIG. 16 is a flowchart of another communications method according to an embodiment of this application.

As shown in FIG. 16, the procedure of establishing the secure tunnel includes the following steps.

S1101: Perform a first phase of establishing the secure tunnel between the first node and the second node.

The first phase is used to implement identity authentication and key agreement between the first node and the second node.

Optionally, in the first phase, an initiator in the procedure of establishing the secure tunnel may be the first node or the second node. To be specific, the first node may actively send a secure tunnel establishment request to the second node, or the second node actively sends a secure tunnel establishment request to the first node.

It may be understood that if the first node is the initiator, the second node is a responder. Alternatively, if the second node is the initiator, the first node is a responder.

In the embodiments of this application, an authentication credential in an IPsec establishment process is a preconfigured digital certificate. Alternatively, the authentication credential may be a pre-shared key (PSK). Alternatively, the authentication credential may be determined through negotiation according to a Diffie-Hellman algorithm.

The pre-shared key includes one of the following cases.

(1) The pre-shared key may be Kgnb. Kgnb is a key used to protect communication security at an access stratum.

(2) The pre-shared key is a random number generated by the first node/second node.

For example, the first node generates a random number. After the first node generates the random number, the first node may use RRC signaling or an F1 interface establishment message to carry the random number, to share the random number with the second node. For example, the second node generates a random number. After the second node generates the random number, the second node may use RRC signaling or an F1 interface establishment message to carry the random number, to share the random number with the first node.

(3) The pre-shared key is generated based on Kgnb and an intermediate parameter.

The intermediate parameter is generated by the first node, and is shared by the first node with the second node. Alternatively, the intermediate parameter is generated by the second node, and is shared by the second node with the first node.

Optionally, the intermediate parameter includes at least one of the following parameters: a cell identifier, an address of the first node, an address of a CU of the second node, a physical cell identifier (PCI), a function counter value (FC value), and a constant.

It may be understood that, for specific implementation of the first phase, refer to the current technology. Details are not described in the embodiments of this application.

S1102: Perform a second phase of establishing the secure tunnel between the first node and the second node.

The second phase is used to negotiate a security parameter used by an IPsec security association, to determine an IPsec security policy and a session key between the first node and the second node.

It may be understood that the IPsec security policy determines a security status corresponding to the secure tunnel.

Optionally, the second phase may include the following steps.

S1: An initiator first sends a key exchange material and an SA payload.

The key exchange material may include a DH value of the initiator, a random number, and the like. The DH value is calculated according to the Diffie-Hellman algorithm.

The SA payload may include a security parameter index, a version number, a list of encryption algorithms supported by the initiator, and the like.

It should be noted that the SA payload may include one or more proposal payloads. One proposal payload may include one or more transform payloads.

It should be noted that, in the IPsec establishment process, when a transform ID of an authentication header protocol in a transform payload in the second phase is set to reserved, it indicates that integrity protection is not enabled currently; and when a transform ID in an encapsulating security payload protocol in the transform payload is set to reserved, it indicates that encryption protection is not enabled currently.

S2: A responder replies with a selected cryptographic algorithm, a DH value of a receiver, a random number, and the like.

It should be noted that, in the procedure of establishing the secure tunnel, IPsec information may be carried in RRC signaling. It should be noted that the RRC signaling may be a signaling radio bearer (SRB) message or a DRB message.

It may be understood that if the SRB message or the DRB message carries the IPsec information, an additional transmission bearer does not need to be established between the first node and the second node.

Optionally, the SRB message carrying the IPsec information may be an SRB message of a DU of the first node in the establishment procedure. In this way, the SRB message is multiplexed. This helps reduce signaling overheads.

In the embodiments of this application, because the IPsec message is used at an IPsec layer, an IPsec layer of the first node may send the IPsec information to an RRC layer of the first node, so that the RRC layer of the first node sends RRC signaling carrying the IPsec information. Alternatively, after an RRC layer of the first node receives RRC signaling carrying the IPsec information, the RRC layer of the first node sends the IPsec information to an IPsec layer of the first node.

In the embodiments of this application, because the IPsec message is used at an IPsec layer, an IPsec layer of the second node may send the IPsec information to an RRC layer of the second node, so that the RRC layer of the second node sends RRC signaling carrying the IPsec information. Alternatively, after an RRC layer of the second node receives RRC signaling carrying the IPsec information, the RRC layer of the second node sends the IPsec information to an IPsec layer of the second node.

Based on the technical solutions shown in FIG. 16, a secure tunnel may be established between the first node and the second node.

In a process of establishing a plurality of secure tunnels between the first node and the second node, the first node and the second node may perform a procedure in the first phase only once. Then, for each of the plurality of secure tunnels, the first node and the second node each perform a procedure in the second phase once.

Alternatively, in a process of establishing a plurality of secure tunnels between the first node and the second node, for each of the plurality of secure tunnels, the first node and the second node each may perform a procedure in the first phase and a procedure in the second phase.

It may be understood that a quantity of secure tunnels established between the first node and the second node may be defined in a protocol, or may be configured according to an operator policy. The embodiments of this application are not limited thereto.

The foregoing mainly describes the solutions in the embodiments of this application from a perspective of interaction between network elements. It may be understood that, to implement the foregoing functions, each network element such as the first node or the second node includes a corresponding hardware structure, a corresponding software module, or a combination thereof for performing each function. A person skilled in the art should be easily aware that, in combination with the examples of units and algorithm steps described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the network device and the terminal may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, division into modules is an example, and is merely logical function division. During actual implementation, there may be another division manner. An example in which each function module is obtained through division based on each corresponding function is used below for description.

Figure 17:
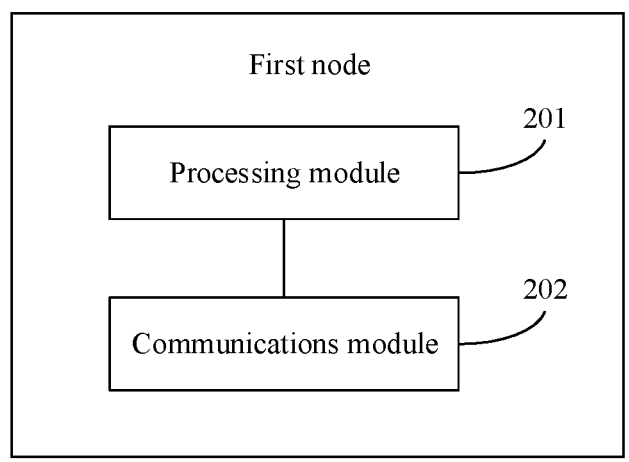
FIG. 17 is a schematic diagram of a structure of a first node according to an embodiment of this application.

FIG. 17 is a schematic diagram of a structure of a first node according to an embodiment of this application. The first node includes a processing module 201 and a communications module 202. The processing module 201 is configured to enable the first node to perform steps S702 and S703 in FIG. 12, and the like. The communications module 202 is configured to enable the first node to perform steps S701 and S704 in FIG. 12, steps S804 and S805 in FIG. 13, step S1004 in FIG. 15, steps S1101 and S1102 in FIG. 16, and the like.

In an example, with reference to the communications apparatus shown in FIG. 7, the processing module 201 in FIG. 17 may be implemented by the processor 101 in FIG. 7, and the communications module 202 in FIG. 17 may be implemented by the communications interface 104 in FIG. 7. This is not limited in the embodiments of this application.

An embodiment of this application further provides a computer-readable storage medium. The computer-readable storage medium stores computer instructions. When the computer-readable storage medium runs on a first network element, the first network element is enabled to perform the method provided in the embodiments of this application.

An embodiment of this application further provides a computer program product including computer instructions. When the computer program product runs on a first network element, the first network element is enabled to perform the method provided in the embodiments of this application.

An embodiment of this application provides a chip. The chip includes a processor. When the processor executes instructions, the chip is enabled to perform the method provided in the embodiments of this application. The instructions may be from a memory inside the chip, or may be from a memory outside the chip. Optionally, the chip further includes an input/output circuit used as a communications interface.

Figure 18:
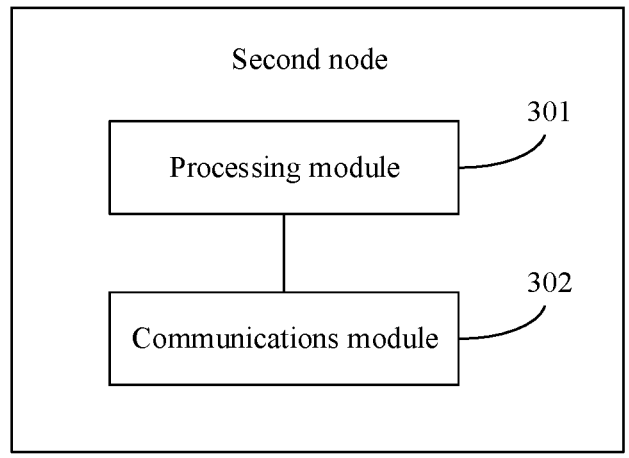
FIG. 18 is a schematic diagram of a structure of a second node according to an embodiment of this application.

FIG. 18 is a schematic diagram of a structure of a second node according to an embodiment of this application. The second node includes a processing module 301 and a communications module 302. The processing module 301 is configured to enable the second node to perform steps S802 and S803 in FIG. 13, steps S901 to S903 in FIG. 14, steps S1001 to S1003 in FIG. 15, and the like. The communications module 302 is configured to enable the second node to perform steps S704 and S705 in FIG. 12, steps S801 and S804 in FIG. 13, step S1004 in FIG. 15, steps S1101 and S1102 in FIG. 16, and the like.

In an example, with reference to the communications apparatus shown in FIG. 7, the processing module 301 in FIG. 18 may be implemented by the processor 101 in FIG. 7, and the communications module 302 in FIG. 18 may be implemented by the communications interface 104 in FIG. 7. This is not limited in the embodiments of this application.

An embodiment of this application further provides a computer-readable storage medium. The computer-readable storage medium stores computer instructions. When the computer-readable storage medium runs on a second network element, the second network element is enabled to perform the method provided in the embodiments of this application.

An embodiment of this application further provides a computer program product including computer instructions. When the computer program product runs on a second network element, the second network element is enabled to perform the method provided in the embodiments of this application.

An embodiment of this application provides a chip. The chip includes a processor. When the processor executes instructions, the chip is enabled to perform the method provided in the embodiments of this application. The instructions may be from a memory inside the chip, or may be from a memory outside the chip. Optionally, the chip further includes an input/output circuit used as a communications interface.

Figure 19:
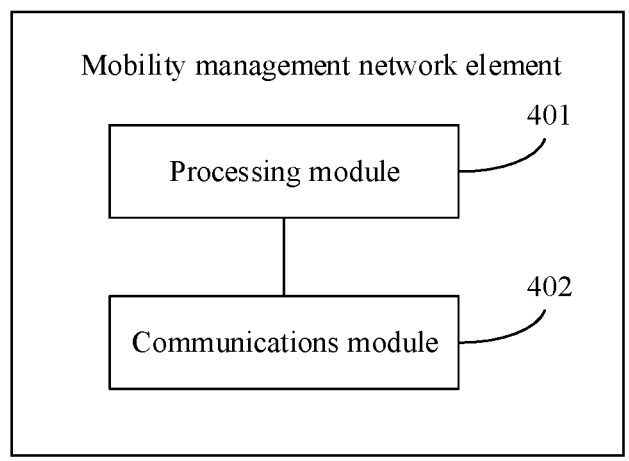
FIG. 19 is a schematic diagram of a structure of a mobility management network element according to an embodiment of this application.

FIG. 19 is a schematic diagram of a structure of a mobility management network element according to an embodiment of this application. The mobility management network element includes a processing module 401 and a communications module 402. The processing module 401 is configured to enable the mobility management network element to perform step S602 in FIG. 10. The communications module 402 is configured to enable the mobility management network element to perform steps S401 and S402 in FIG. 8.

In an example, with reference to the communications apparatus shown in FIG. 7, the processing module 401 in FIG. 19 may be implemented by the processor 101 in FIG. 7, and the communications module 402 in FIG. 19 may be implemented by the communications interface 104 in FIG. 7. This is not limited in the embodiments of this application.

An embodiment of this application further provides a computer-readable storage medium. The computer-readable storage medium stores computer instructions. When the computer-readable storage medium runs on a mobility management network element, the mobility management network element is enabled to perform the method provided in the embodiments of this application.

An embodiment of this application further provides a computer program product including computer instructions. When the computer program product runs on a mobility management network element, the mobility management network element is enabled to perform the method provided in the embodiments of this application.

An embodiment of this application provides a chip. The chip includes a processor. When the processor executes instructions, the chip is enabled to perform the method provided in the embodiments of this application. The instructions may be from a memory inside the chip, or may be from a memory outside the chip. Optionally, the chip further includes an input/output circuit used as a communications interface.

Figure 20:
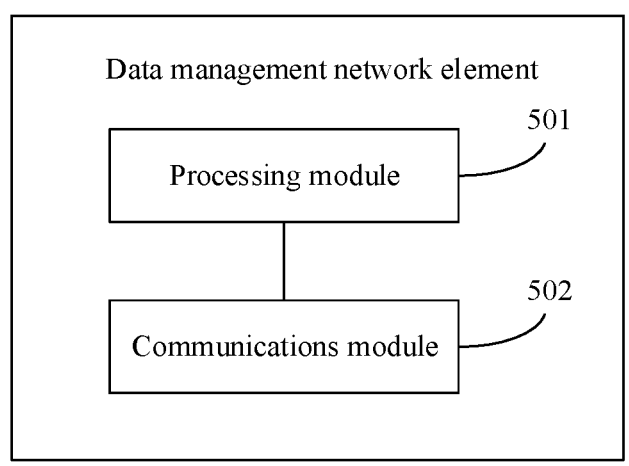
FIG. 20 is a schematic diagram of a structure of a data management network element according to an embodiment of this application.

FIG. 20 is a schematic diagram of a structure of a data management network element according to an embodiment of this application. The data management network element includes a processing module 501 and a communications module 502. The processing module 501 is configured to enable the data management network element to perform step S404 in FIG. 8. The communications module 502 is configured to enable the data management network element to perform step S403 in FIG. 8, step S501 in FIG. 9, and the like.

In an example, with reference to the communications apparatus shown in FIG. 7, the processing module 501 in FIG. 20 may be implemented by the processor 101 in FIG. 7, and the communications module 502 in FIG. 20 may be implemented by the communications interface 104 in FIG. 7. This is not limited in the embodiments of this application.

An embodiment of this application further provides a computer-readable storage medium. The computer-readable storage medium stores computer instructions. When the computer-readable storage medium runs on a data management network element, the data management network element is enabled to perform the method provided in the embodiments of this application.

An embodiment of this application further provides a computer program product including computer instructions. When the computer program product runs on a data management network element, the data management network element is enabled to perform the method provided in the embodiments of this application.

An embodiment of this application provides a chip. The chip includes a processor. When the processor executes instructions, the chip is enabled to perform the method provided in the embodiments of this application. The instructions may be from a memory inside the chip, or may be from a memory outside the chip. Optionally, the chip further includes an input/output circuit used as a communications interface.

It should be understood that the computer instructions may be stored in a computer-readable storage medium or may be transmitted from a computer-readable storage medium to another computer-readable storage medium.

For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

The foregoing descriptions about implementations allow a person skilled in the art to clearly understand that, for the purpose of convenient and brief description, division into only the foregoing function modules is used as an example for illustration. In actual application, the foregoing functions can be allocated to different function modules for implementation based on a requirement, that is, an inner structure of an apparatus is divided into different function modules to implement all or some of the functions described above.

It should be understood that in the several embodiments provided in this application, the disclosed apparatuses and methods may be implemented in other manners. For example, the described apparatus embodiments are merely examples. Division into the modules or units is merely logical function division. There may be another division manner in actual implementation. For example, a plurality of units or components may be combined or may be integrated into another apparatus, or some features may be ignored or not be performed.

In addition, in this application, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may be one or more physical units, that is, may be located in one place, or may be distributed on a plurality of different places. Some or all of the units may be selected based on actual requirements to achieve the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions in the embodiments of this application essentially, or the part contributing to the current technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in the embodiments of this application.

The foregoing descriptions are merely specific implementations of this application, but are not intended to limit the protection scope of this application. Any variation or replacement within the technical scope disclosed in this application shall fall within the protection scope of this application recited in the claims.

What is claimed is:

1. A communications system, comprising:
   a first node; and
   a second node, wherein a plurality of secure tunnels are established between the first node and the second node, and the plurality of secure tunnels correspond to different security statuses, wherein
   the first node comprises a first processor and a first memory coupled to the first processor and having computer-readable instructions stored thereon which, when executed by the first processor, cause the first node to:
   receive an uplink data packet from a terminal;
   determine a packet data convergence protocol (PDCP) layer security status of the uplink data packet;
   determine a target secure tunnel based on the PDCP layer security status of the uplink data packet and the security statuses of the plurality of secure tunnels, wherein the target secure tunnel and the plurality of secure tunnels are in an IP layer; and
   send the uplink data packet to the second node through the target secure tunnel, and wherein
   the second node comprising a second processor and a second memory coupled to the second processor and having computer-readable instructions stored thereon which, when executed by the second processor, cause the second node to:
   receive the uplink data packet from the first node; and
   send the uplink data packet to a user plane network element.

2. The communications system according to claim 1, wherein
   the first node is configured to select a secure tunnel whose security status is complementary to the PDCP layer security status of the uplink data packet from the plurality of secure tunnels as the target secure tunnel based on the PDCP layer security status of the uplink data packet and the security statuses of the plurality of secure tunnels.

3. The communications system according to claim 1, wherein
   the first node is configured to determine the PDCP layer security status of the uplink data packet based on a pre-stored first correspondence and an identifier of a first transmission tunnel used to transmit the uplink data packet, wherein the first correspondence is a correspondence between the identifier of the first transmission tunnel and a PDCP layer security status, and the first transmission tunnel is a transmission tunnel between the first node and the second node.

4. The communications system according to claim 3, wherein
   the second node is further configured to:
   obtain a correspondence between an identifier of a protocol data unit (PDU) session and a PDCP layer security status;
   obtain a correspondence between an identifier of a PDU session and an identifier of the first transmission tunnel;
   generate the first correspondence based on the correspondence between an identifier of a PDU session and a PDCP layer security status and the correspondence between an identifier of a PDU session and an identifier of the first transmission tunnel; and
   send the first correspondence to the first node, and wherein
   the first node is further configured to receive the first correspondence.

5. The communications system according to claim 2, wherein that the security status of the target secure tunnel is complementary to the PDCP layer security status of the uplink data packet comprises one of the following cases:
   in response to the PDCP layer security status of the uplink data packet being integrity protection enabled, the security status of the target secure tunnel is integrity protection disabled; or
   in response to the PDCP layer security status of the uplink data packet being integrity protection disabled, the security status of the target secure tunnel is integrity protection enabled.

6. The communications system according to claim 2, wherein that the security status of the target secure tunnel is complementary to the PDCP layer security status of the uplink data packet comprises one of the following cases:
   in response to the PDCP layer security status of the uplink data packet being encryption protection enabled, the security status of the target secure tunnel is encryption protection disabled; or
   in response to the PDCP layer security status of the uplink data packet being encryption protection disabled, the security status of the target secure tunnel is encryption protection enabled.

7. The communications system according to claim 2, wherein that the security status of the target secure tunnel is complementary to the PDCP layer security status of the uplink data packet comprises one of the following cases:
   in response to the PDCP layer security status of the uplink data packet being both integrity protection and encryption protection disabled, the security status of the target secure tunnel is both integrity protection and encryption protection enabled;
   in response to the PDCP layer security status of the uplink data packet is both integrity protection and encryption protection enabled, the security status of the target secure tunnel is both integrity protection and encryption protection disabled;
   in response to the PDCP layer security status of the uplink data packet is integrity protection enabled and encryption protection disabled, the security status of the target secure tunnel is integrity protection disabled and encryption protection enabled; or
   in response to the PDCP layer security status of the uplink data packet is integrity protection disabled and encryption protection enabled, the security status of the target secure tunnel is integrity protection enabled and encryption protection disabled.

8. The communications system according to claim 1, wherein
   the second node is further configured to:
   receive a downlink data packet from the user plane network element;
   determine a PDCP layer security status of the downlink data packet;
   determine a new target secure tunnel based on the PDCP layer security status of the downlink data packet and the security statuses of the plurality of secure tunnels; and
   send the downlink data packet to the first node through the new target secure tunnel, and wherein the first node is further configured to:
receive the downlink data packet from the second node; and
send the downlink data packet to the terminal.

9. A communications method, wherein the communications method is applied to a first node, a plurality of secure tunnels are established between the first node and a second node, the plurality of secure tunnels correspond to different security statuses, and the method comprises:
receiving, an uplink data packet from a terminal;
determining, a packet data convergence protocol (PDCP) layer security status of the uplink data packet;
determining, a target secure tunnel based on the PDCP layer security status of the uplink data packet and the security statuses of the plurality of secure tunnels, wherein the target secure tunnel and the plurality of secure tunnels are in an IP layer; and
sending, the uplink data packet to the second node through the target secure tunnel.

10. The communications method according to claim 9, wherein the determining, the target secure tunnel based on the PDCP layer security status of the uplink data packet and the security statuses of the plurality of secure tunnels comprises:
selecting, a secure tunnel whose security status is complementary to the PDCP layer security status of the uplink data packet from the plurality of secure tunnels as the target secure tunnel based on the PDCP layer security status of the uplink data packet and the security statuses of the plurality of secure tunnels.

11. The communications method according to claim 9, wherein the determining, the PDCP layer security status of the uplink data packet comprises:
determining, the PDCP layer security status of the uplink data packet based on a pre-stored first correspondence and an identifier of a first transmission tunnel used to transmit the uplink data packet, wherein the first correspondence is a correspondence between the identifier of the first transmission tunnel and a PDCP layer security status, and the first transmission tunnel is a transmission tunnel between the first node and the second node.

12. The communications method according to claim 11, wherein the method further comprises:
receiving, the first correspondence sent by the second node.

13. The communications method according to claim 10, wherein that the security status of the target secure tunnel is complementary to the PDCP layer security status of the uplink data packet comprises one of the following cases:
in response to the PDCP layer security status of the uplink data packet being integrity protection enabled, the security status of the target secure tunnel is integrity protection disabled; or
in response to the PDCP layer security status of the uplink data packet being integrity protection disabled, the security status of the target secure tunnel is integrity protection enabled.

14. The communications method according to claim 10, wherein that the security status of the target secure tunnel is complementary to the PDCP layer security status of the uplink data packet comprises one of the following cases:
in response to the PDCP layer security status of the uplink data packet being encryption protection enabled, the security status of the target secure tunnel is encryption protection disabled; or
in response to the PDCP layer security status of the uplink data packet being encryption protection disabled, the security status of the target secure tunnel is encryption protection enabled.

15. The communications method according to claim 10, wherein that the security status of the target secure tunnel is complementary to the PDCP layer security status of the uplink data packet comprises one of the following cases:
in response to the PDCP layer security status of the uplink data packet being both integrity protection and encryption protection disabled, the security status of the target secure tunnel is both integrity protection and encryption protection enabled;
in response to the PDCP layer security status of the uplink data packet being both integrity protection and encryption protection enabled, the security status of the target secure tunnel is both integrity protection and encryption protection disabled;
in response to the PDCP layer security status of the uplink data packet being integrity protection enabled and encryption protection disabled, the security status of the target secure tunnel is integrity protection disabled and encryption protection enabled; or
in response to the PDCP layer security status of the uplink data packet being integrity protection disabled and encryption protection enabled, the security status of the target secure tunnel is integrity protection enabled and encryption protection disabled.

16. A communications apparatus, wherein a plurality of secure tunnels are established between the communications apparatus and a second node, the plurality of secure tunnels correspond to different security statuses, and the communications apparatus comprises:
at least one processor; and
a memory coupled to the at least one processor and having program instructions stored thereon which, when executed by the at least one processor, cause the communications apparatus to:
receive an uplink data packet from a terminal;
determine a packet data convergence protocol (PDCP) layer security status of the uplink data packet;
determine a target secure tunnel based on the PDCP layer security status of the uplink data packet and the security statuses of the plurality of secure tunnels, wherein the target secure tunnel and the plurality of secure tunnels are in an IP layer; and
send the uplink data packet to the second node through the target secure tunnel.

17. The communications apparatus according to claim 16, wherein the program instructions further cause the communications apparatus to:
select a secure tunnel whose security status is complementary to the PDCP layer security status of the uplink data packet from the plurality of secure tunnels as the target secure tunnel based on the PDCP layer security status of the uplink data packet and the security statuses of the plurality of secure tunnels.

18. The communications apparatus according to claim 16, wherein the program instructions further cause the communications apparatus to:
determine the PDCP layer security status of the uplink data packet based on a pre-stored first correspondence and an identifier of a first transmission tunnel used to transmit the uplink data packet, wherein the first correspondence is a correspondence between the identifier of the first transmission tunnel and a PDCP layer security status, and the first transmission tunnel is a transmission tunnel between the communications apparatus and the second node.

19. The communications apparatus according to claim 17, wherein that the security status of the target secure tunnel is complementary to the PDCP layer security status of the uplink data packet comprises one of the following cases:

if the PDCP layer security status of the uplink data packet is integrity protection enabled, the security status of the target secure tunnel is integrity protection disabled; or if the PDCP layer security status of the uplink data packet is integrity protection disabled, the security status of the target secure tunnel is integrity protection enabled.

20. The communications apparatus according to claim 17, wherein that the security status of the target secure tunnel is complementary to the PDCP layer security status of the uplink data packet comprises one of the following cases:

in response to the PDCP layer security status of the uplink data packet being encryption protection enabled, the security status of the target secure tunnel is encryption protection disabled; or in response to the PDCP layer security status of the uplink data packet being encryption protection disabled, the security status of the target secure tunnel is encryption protection enabled.

\* \* \* \* \*